US011938736B2

(12) United States Patent
Hayashi et al.

(10) Patent No.: US 11,938,736 B2
(45) Date of Patent: Mar. 26, 2024

(54) PRINTING LIQUID CONTAINER, AND SYSTEM INCLUDING PRINTING LIQUID CONTAINER AND TANK

(71) Applicant: BROTHER KOGYO KABUSHIKI KAISHA, Nagoya (JP)

(72) Inventors: Masahiro Hayashi, Nishio (JP); Satoru Oki, Nagoya (JP); Nanami Ashida, Nagoya (JP); Naoya Okazaki, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/678,187

(22) Filed: Feb. 23, 2022

(65) Prior Publication Data

US 2022/0274413 A1 Sep. 1, 2022

(30) Foreign Application Priority Data

Feb. 26, 2021 (JP) ................................ 2021-030268

(51) Int. Cl.
*B41J 2/175* (2006.01)

(52) U.S. Cl.
CPC ....... *B41J 2/17513* (2013.01); *B41J 2/17553* (2013.01)

(58) Field of Classification Search
CPC .... B41J 2/175; B41J 2/17506; B41J 2/17509; B41J 2/17513; B41J 2/17523; B41J 2/17553; B41J 29/13
See application file for complete search history.

(56) References Cited

U.S. PATENT DOCUMENTS 5,920,333 A * 7/1999 Bates ................. B65D 81/3205 347/85
6,164,768 A * 12/2000 Murphy ............... B41J 2/17506 347/85
2016/0121619 A1 5/2016 Tomoguchi
2016/0355021 A1 12/2016 Kanbara et al.
(Continued)

FOREIGN PATENT DOCUMENTS

JP 2021-006396 A 1/2021

OTHER PUBLICATIONS

International Search Report and Written Opinion issued in PCT application No. PCT/JP2022/007058 dated May 24, 2022.

*Primary Examiner* — Anh T Vo
(74) *Attorney, Agent, or Firm* — Scully, Scott, Murphy & Presser, PC

(57) ABSTRACT

A printing liquid container includes first and second members having a supply port and a valve, respectively. The members rotate with respect to each other between first and second states. The valve closes and opens the supply port in the first and second states, respectively. The first and second members have first and second fitting portions, respectively. The fitting portions fit to a fitted portion of a tank in the first state. The second fitting portion allows rotation of the second member with respect to the fitted portion when the first fitting portion are fitted to the fitting portion. The first member does not rotate together with the second member due to fitting between the fitted portion and the first fitting portion. The second member cannot be removed from the fitted portion due to fitting of the second fitting portion to the fitted portion in the second state.

14 Claims, 14 Drawing Sheets

(56) References Cited

U.S. PATENT DOCUMENTS

| | | | |
|---|---|---|---|
| 2018/0001650 | A1 | 1/2018 | Miyashita et al. |
| 2019/0061359 | A1 | 2/2019 | Duca et al. |
| 2020/0406625 | A1 | 12/2020 | Mizutani et al. |

* cited by examiner

PRINTING LIQUID CONTAINER, AND SYSTEM INCLUDING PRINTING LIQUID CONTAINER AND TANK

CROSS REFERENCE TO RELATED APPLICATIONS

This application claims priority under 35 U.S.C. § 119 from Japanese Patent Application No. 2021-030268 filed on Feb. 26, 2021. The entire subject matter of the application is incorporated herein by reference.

BACKGROUND

Aspects of the present disclosure relate to a printing liquid container for storing liquid.

In a conventional printing device, a configuration is known in which ink is supplied to a tank from a bottle connected to the tank each time ink stored in the tank is consumed. When the ink stored in the tank is consumed, the ink is supplied from the bottle to the tank through an injection port of the tank. When different types of ink, such as different ink colors, are stored in a plurality of tanks, a bottle is formed with a concavo-convex shape that can only be fitted to a specific tank so as not to be erroneously connected to tanks other than the specific tank.

SUMMARY

A supply port is formed at a distal end of a tapered nozzle so that ink smoothly flows out from the bottle. On the other hand, in consideration of the amount of ink that can be stored in the bottle, a main body of the bottle has an outer diameter larger than that of the nozzle. When the bottle is connected to the tank with the bottle upside down, that is, with the nozzle positioned below the main body, if the connection between the nozzle and the tank is incomplete or the bottle is inclined, weight of the ink may make the bottle unstable and the nozzle may be pulled out of the tank.

According to aspects of the present disclosure, there is provided a printing liquid container configured to fit to a tank including a fitted portion having an injection port. The printing liquid container includes a first member having a supply port communicating with an internal space, and a second member having a valve configured to open or close the supply port. The first member and the second member are coupled to each other so as to be rotatable with respect to each other between a first state and a second state. An internal space of the first member and an internal space of the second member constitute a storage chamber configured to store liquid. The valve closes the supply port in the first state and opens the supply port in the second state. One of the first member and the second member has a first fitting portion configured to fit to the fitted portion. An other of the first member and the second member has a second fitting portion configured to fit to the fitted portion. The first fitting portion and the second fitting portion fit to the fitted portion in the first state. The second fitting portion allows rotation of the other of the first member and the second member with respect to the fitted portion in a state where the fitted portion and the first fitting portion are fitted to each other. The one of the first member and the second member does not rotate together with the rotation of the other of the first member and the second member due to the fitting between the fitted portion and the first fitting portion. The other of the first member and the second member cannot be removed from the fitted portion due to fitting of the second fitting portion to the fitted portion in the second state.

According to aspects of the present disclosure, there is further provided a system including a printing liquid container and a tank. The tank includes a fitted portion having an injection port. The printing liquid container includes a first member having a supply port communicating with an internal space, and a second member having a valve configured to open or close the supply port. The first member and the second member are coupled to each other so as to be rotatable with respect to each other between a first state and a second state. An internal space of the first member and an internal space of the second member constitute a storage chamber configured to store liquid. The valve closes the supply port in the first state and opens the supply port in the second state. One of the first member and the second member has a first fitting portion configured to fit to the fitted portion. An other of the first member and the second member has a second fitting portion configured to fit to the fitted portion. The first fitting portion and the second fitting portion fit to the fitted portion in the first state. The second fitting portion allows rotation of the other of the first member and the second member with respect to the fitted portion in a state where the fitted portion and the first fitting portion are fitted to each other. The one of the first member and the second member does not rotate together with the rotation of the other of the first member and the second member due to the fitting between the fitted portion and the first fitting portion. The other of the first member and the second member cannot be removed from the fitted portion due to fitting of the second fitting portion to the fitted portion in the second state.

DETAILED DESCRIPTION

Figure 1:
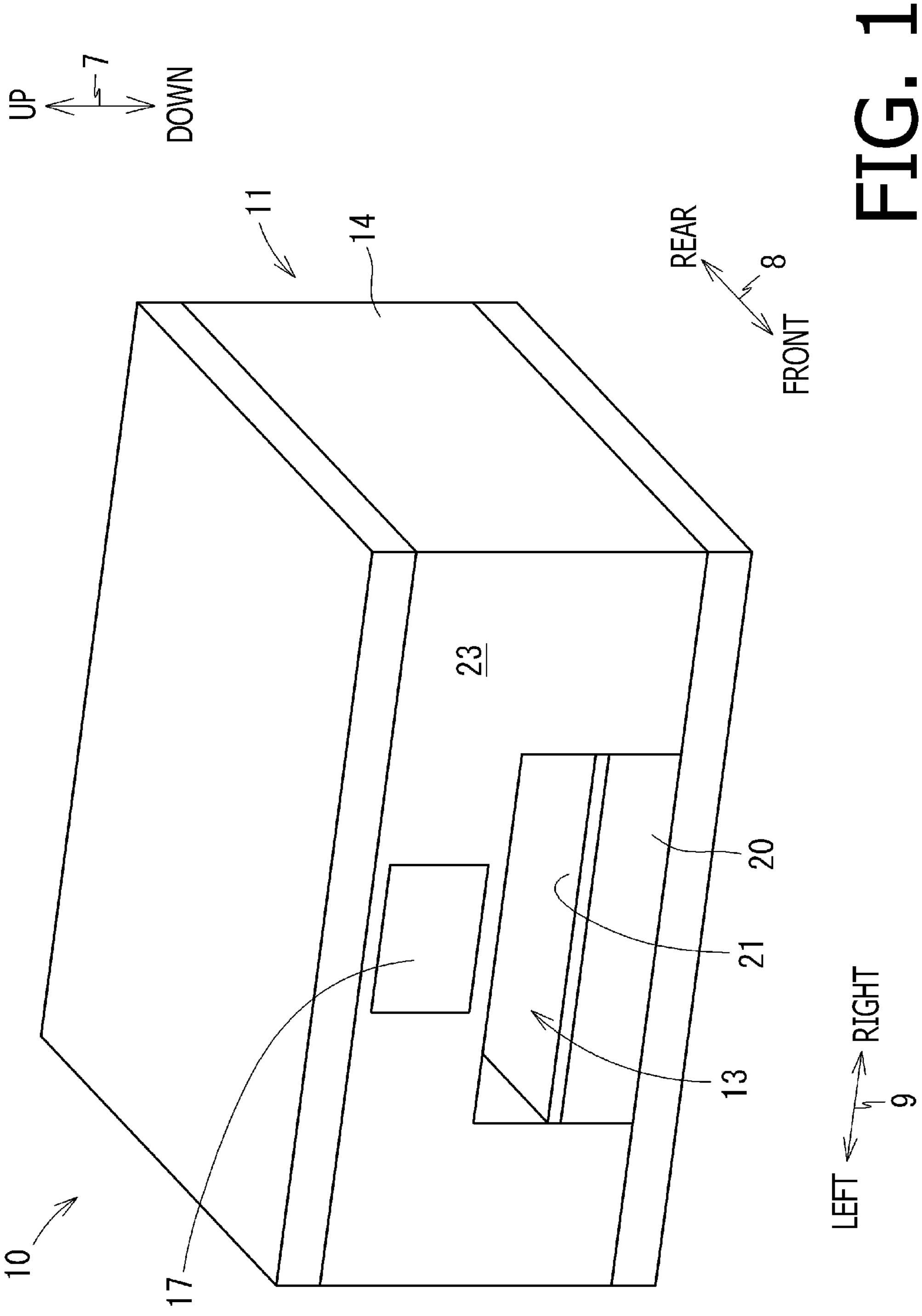
FIG. 1 is an external perspective view of a multifunction device.

Hereinafter, an embodiment of the present disclosure will be described. It should be noted that the embodiment described below is merely an example of the present disclosure, and the embodiment can be modified appropriately without changing the scope of the present disclosure. In the following description, a way from a starting point to an ending point of an arrow is referred to as an orientation, and ways along a line connecting the starting point and the ending point of the arrow are collectively referred to as a direction. In other words, the orientation is a component of the direction. An up-down direction 7 is defined based on a posture of a multifunction device 10 which is installed on a horizontal plane so as to be usable (the posture shown in FIG. 1 which is also referred to as a "use posture"), a front-rear direction 8 is defined based on a surface on which an opening 13 of the multifunction device 10 is provided which is defined as front, and a left-right direction 9 is defined by viewing the multifunction device 10 from the front. In the present embodiment, in the use posture, the up-down direction 7 corresponds to the vertical direction, and the front-rear direction 8 and the left-right direction 9 correspond to the horizontal direction. The front-rear direction 8 and the left-right direction 9 are orthogonal to each other.

[Overall Structure of Multifunction Device 10]

As shown in FIG. 1, the multifunction device 10 has a housing 14 having a substantially rectangular parallelepiped shape. A printer unit 11 is provided in a lower part of the housing 14. The multifunction device 10 has various functions such as a facsimile function and a print function. The multifunction device 10 has a printing function of recording an image on one side of a sheet 12 by an inkjet system. It should be noted that the multifunction device 10 may be configured to record images on both sides of the sheet 12. An operation unit 17 is provided on an upper part of the housing 14. The operation unit 17 consists of buttons operated for image recording instructions and various settings, a liquid crystal display for displaying various information, and the like. In the present embodiment, the operation unit 17 consists of a touch panel which serves as the buttons and the liquid crystal display.

Figure 2:
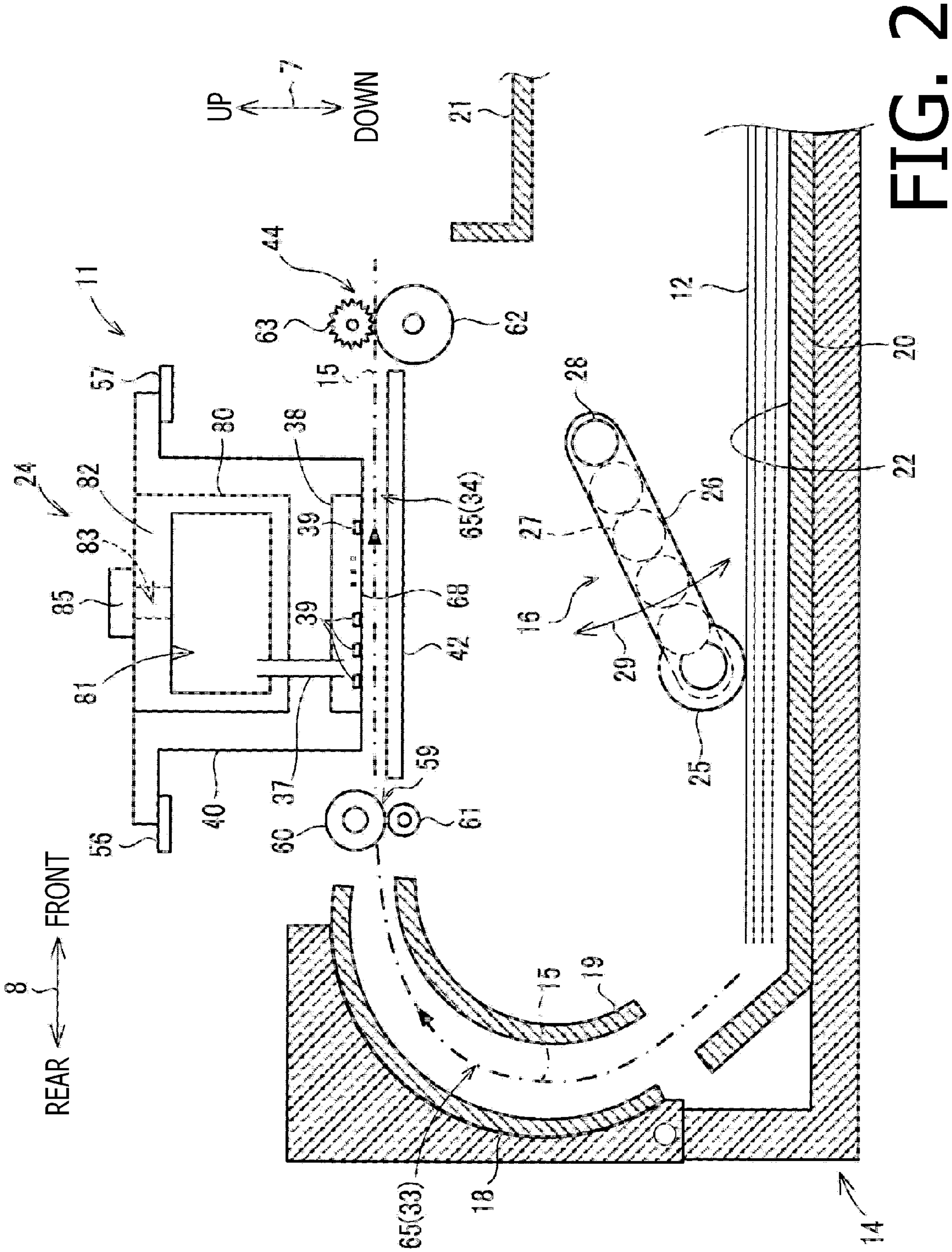
FIG. 2 is a longitudinal cross-sectional view schematically showing an internal structure of a printer unit.
Figure 3:
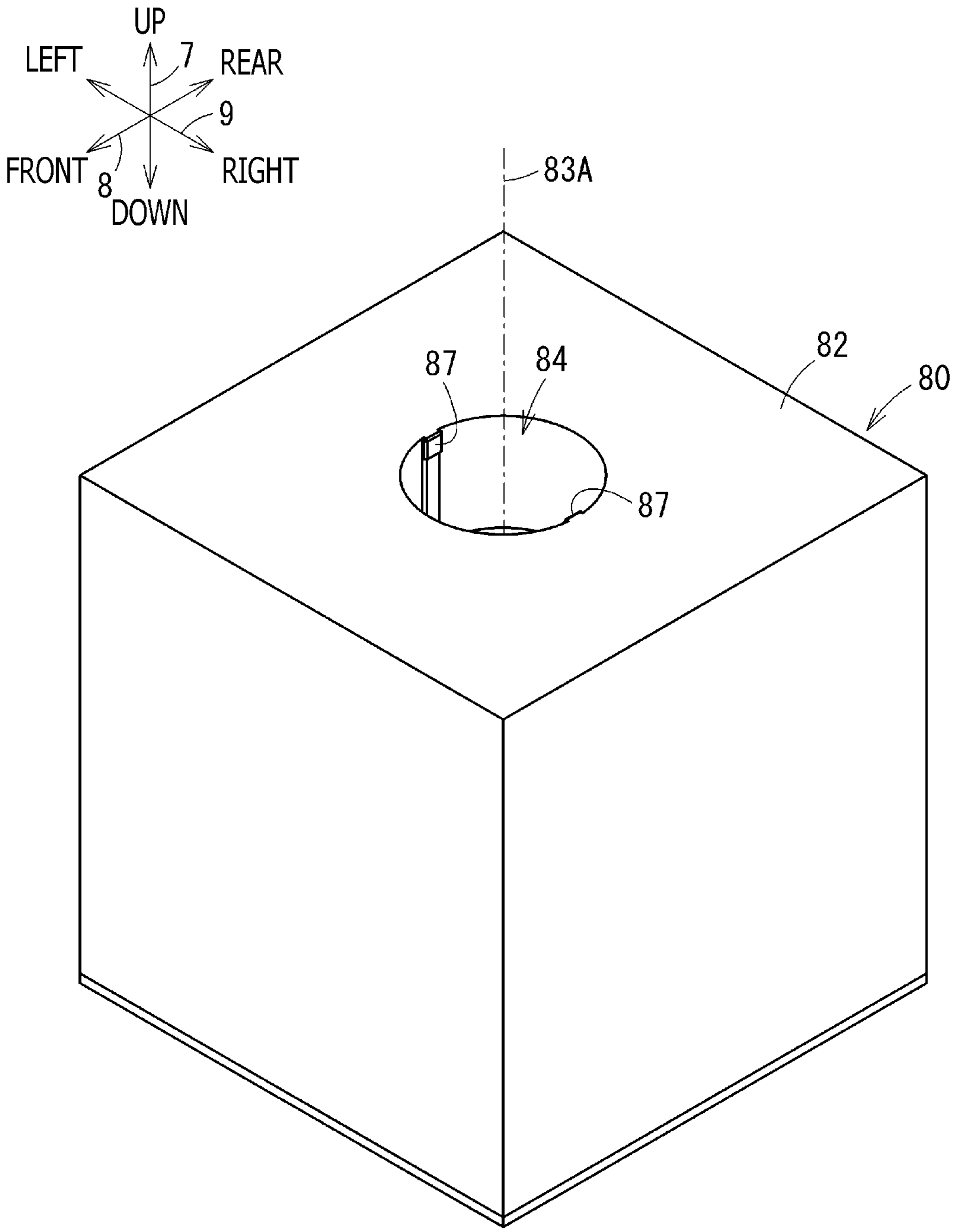
FIG. 3 is an external perspective view of a tank.

As shown in FIG. 2, the printer unit 11 includes a feeding tray 20, a feeding unit 16, an outer guide member 18, an inner guide member 19, a conveying roller pair 59, a discharge roller pair 44, a platen 42, and a recording unit 24 which are accommodated in the housing 14. Various state sensors configured to detect states of the multifunction device 10 and output signals corresponding to the detection results are accommodated in the housing 14. The configuration of the printer unit 11 is merely an example, and the configuration of the printer unit 11 may be replaced with another known configuration.

[Feeding Tray 20]

As shown in FIG. 1, an opening 13 is formed on a front surface 23 of the printer unit 11. The feeding tray 20 can be inserted into and extracted from the housing 14 through the opening 13 by moving the feeding tray 20 in the front-rear direction 8. The feeding tray 20 is movable between a feeding position (a position shown in FIGS. 1 and 2) where the feeding tray 20 is mounted to the housing 14 and a non-feeding position where the feeding tray 20 is extracted from the housing 14. The feeding tray 20 moves to the feeding position by being inserted backward with respect to the housing 14, and moves to the non-feeding position by being pulled out forward with respect to the housing 14.

The feeding tray 20 is a box-shaped member having an open upper portion and accommodates the sheets 12. As shown in FIG. 2, the sheets 12 are supported on a bottom plate 22 of the feeding tray 20 in a stacked state. A discharge tray 21 is provided above a front portion of the feeding tray 20. The sheet 12 on which an image has been recorded by the recording unit 24 and discharged is supported on an upper surface of the discharge tray 21.

As shown in FIG. 2, when the feeding tray 20 is at the feeding position, the sheets 12 supported by the feeding tray 20 can be fed to a conveying path 65.

[Feeding Unit 16]

As shown in FIG. 2, the feeding unit 16 is arranged below the recording unit 24 and above the bottom plate 22 of the feeding tray 20. The feeding unit 16 includes a feeding roller 25, a feeding arm 26, a drive transmission mechanism 27, and a shaft 28. The feeding roller 25 is rotatably supported at a distal end of the feeding arm 26. The feeding arm 26 swings about the shaft 28 provided at a proximal end in a direction of an arrow 29. Thus, the feeding roller 25 can contact and separate from the feeding tray 20 or the sheet 12 supported by the feeding tray 20.

The feeding roller 25 rotates by a driving force of a motor transmitted to the feeding roller 25 by the drive transmission mechanism 27 in which a plurality of gears are meshed. As a result, of the sheets 12 supported by the bottom plate 22 of the feeding tray 20 at the feeding position, the uppermost sheet 12 in contact with the feeding roller 25 is fed to the conveying path 65.

[Conveying Path 65]

As shown in FIG. 2, the conveying path 65 extends from a rear end of the feeding tray 20. The conveying path 65 includes a curved portion 33 and a straight portion 34. The curved portion 33 extends upward from the rear to the front in a U-shape. The straight portion 34 extends generally along the front-rear direction 8.

The curved portion 33 is formed by the outer guide member 18 and the inner guide member 19 opposed to each other at a predetermined interval. The outer guide member 18 and the inner guide member 19 extend in the left-right direction 9. Within a range where the recording unit 24 is arranged, the straight portion 34 is formed by the recording unit 24 and the platen 42 opposed to each other with a predetermined interval in the up-down direction 7.

The sheet 12 supported by the feeding tray 20 is conveyed by the feeding roller 25 through the curved portion 33 and reaches the conveying roller pair 59. The sheet 12 nipped by the conveying roller pair 59 is conveyed forward through the straight portion 34 toward the recording unit 24. Ink ejected from the recording unit 24 adheres to the sheet 12 that has reached a position directly below the recording unit 24 and thereby an image is recorded on the sheet 12. The sheet 12 on which the image has been recorded is conveyed forward through the straight portion 34 and discharged on the discharge tray 21. As described above, the sheet 12 is conveyed along a conveying orientation 15 indicated by an arrow of a one dot chain line in FIG. 2.

[Conveying Roller Pair 59 and Discharge Roller Pair 44]

As shown in FIG. 2, the conveying roller pair 59 is arranged in the straight portion 34. The discharge roller pair 44 is arranged in the straight portion 34 downstream of the conveying roller pair 59 in the conveying orientation 15.

The conveying roller pair 59 includes a conveying roller 60 and a pinch roller 61 arranged below the conveying roller 60. The pinch roller 61 is pressed against the conveying roller 60 by a not-shown elastic member such as a coil spring. The conveying roller pair 59 can nip the sheet 12.

The discharge roller pair 44 includes a discharge roller 62 and a spur roller 63 arranged above the discharge roller 62. The spur roller 63 is pressed toward the discharge roller 62 by a not-shown elastic member such as a coil spring. The discharge roller pair 44 is can nip the sheet 12.

The conveying roller 60 and the discharge roller 62 are rotated by driving forces from motors. As the conveying roller 60 rotates in a state where the sheet 12 is nipped by the conveying roller pair 59, the sheet 12 is conveyed in the conveying orientation 15 by the conveying roller pair 59 and conveyed on the platen 42. As the discharge roller 62 rotates in a state where the sheet 12 is nipped by the discharge roller pair 44, the sheet 12 is conveyed in the conveying orientation 15 by the discharge roller pair 44 and discharged onto the discharge tray 21.

[Platen 42]

As shown in FIG. 2, the platen 42 is arranged in the straight portion 34 of the conveying path 65. The platen 42 faces the recording unit 24 in the up-down direction 7. The platen 42 supports the sheet 12 conveyed through the conveying path 65 from below.

[Recording Unit 24]

As shown in FIG. 2, the recording unit 24 is arranged above the platen 42. The recording unit 24 includes a carriage 40, a head 38, and a tank 80.

The carriage 40 is supported by two guide rails 56 and 57 which are spaced apart from each other in the front-rear direction 8 so as to be movable along the left-right direction 9 orthogonal to the conveying orientation 15. The guide rail 56 is arranged upstream of the head 38 in the conveying orientation 15. The guide rail 57 is arranged downstream of the head 38 in the conveying orientation 15. The guide rails 56 and 57 are supported by a pair of not-shown side frames arranged outside the straight portion 34 of the conveying path 65 in the left-right direction 9. The carriage 40 moves when a driving force is supplied from the motor.

The head 38 is supported by the carriage 40. A lower surface 68 of the head 38 is exposed downward and faces the platen 42. The head 38 includes a plurality of nozzles 39, an ink flow path 37, and a not-shown piezoelectric element.

The plurality of nozzles 39 are open to the lower surface 68 of the head 38. The ink flow path 37 connects the tank 80 and the plurality of nozzles 39. The piezoelectric element deforms as power is supplied, and deforms in the ink flow path 37 to eject ink droplets downward from the nozzles 39.

Figure 4:
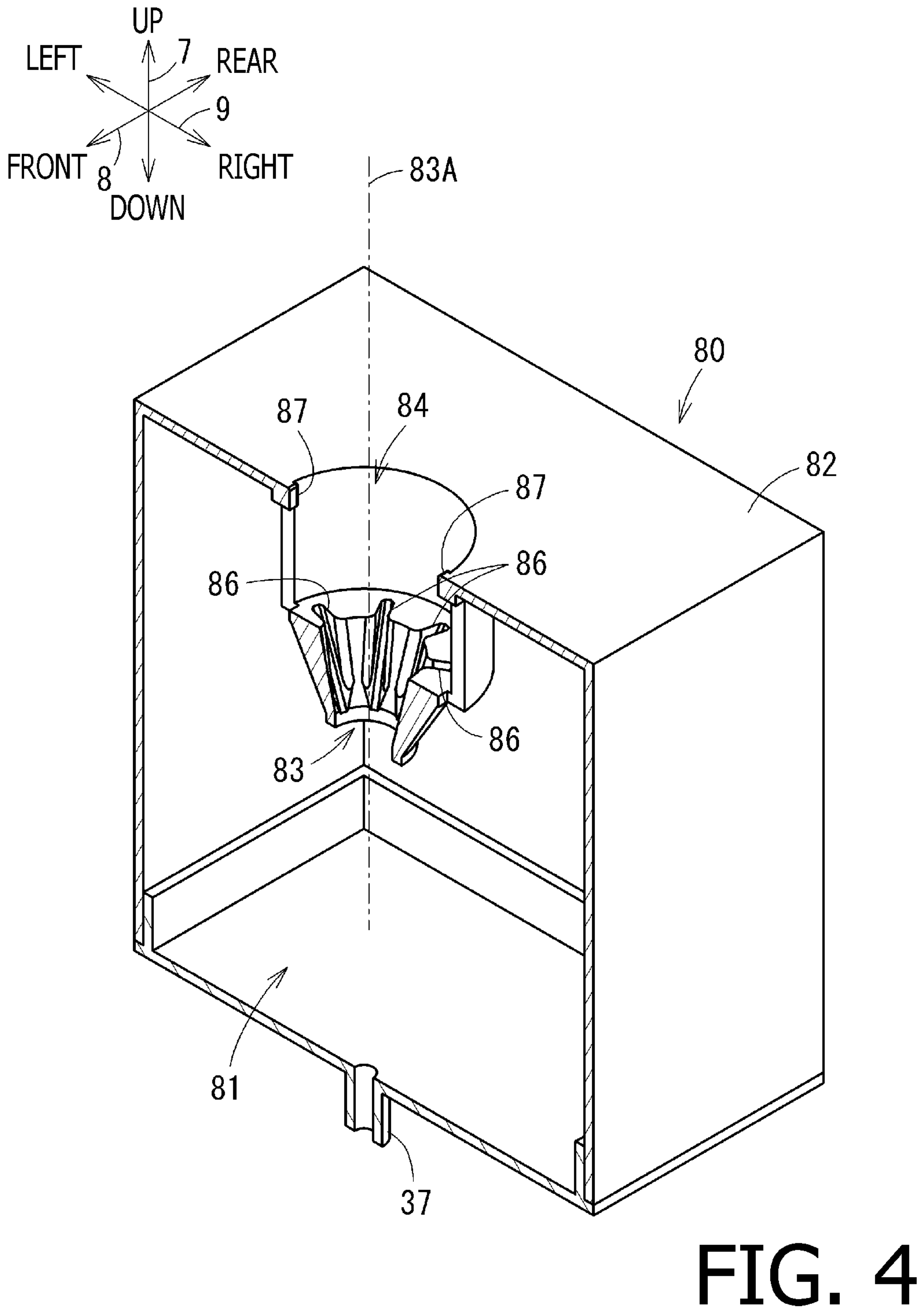
FIG. 4 is a cross-sectional view showing a section of the tank along an up-down direction including an axis of the tank.

As shown in FIG. 2, the tank 80 is mounted on the carriage 40. As shown in FIGS. 2 and 4, the tank 80 has an internal space 81. Ink is stored in the internal space 81. The internal space 81 of the tank 80 communicates with the plurality of nozzles 39 via the ink flow path 37. As a result, ink is supplied from the internal space 81 to the nozzles 39.

As shown in FIG. 2, the tank 80 is arranged above the head 38. Although, in the present embodiment, the tank 80 is arranged above the head 38, the positional relationship between the tank 80 and the head 38 may be changed as appropriate. In the present embodiment, the recording unit 24 includes one tank 80. Black ink is stored in the one tank 80. It should be noted that the color of ink stored in the tank 80 is not limited to black.

As shown in FIG. 4, an upper wall 82 of the tank 80 has a recess 84 that is recessed toward the internal space 81. A cross section of the recess 84 is a circular shape into which a bottle 100 (see FIG. 5) can be inserted. An injection port 83 configured to inject ink into the internal space 81 is formed at a lower end of the recess 84. A plurality of grooves 86 into which the bottle 100 described later is to be fitted are radially formed in the recess 84 around the injection port 83. Each groove 86 extends linearly outward from the injection port 83.

Two projections 87 are formed at an upper end portion of the recess 84. The two projections 87 are arranged at intervals of 180 degrees about an axis 83A of the injection port 83. Each projection 87 projects from the upper end portion of the recess 84 toward the axis 83A.

As shown in FIG. 2, a lid 85 is fitted in the recess 84. When the lid 85 is removed, the injection port 83 is exposed to the outside. In this state, the bottle 100 is inserted into the recess 84, and ink is injected from the bottle 100 into the internal space 81 through the injection port 83.

Although not shown in the drawings, the tank 80 may be provided with an atmospheric relief port. The atmospheric relief port may be openable and closable by a solenoid valve or the like.

[Bottle 100]

Figure 5:
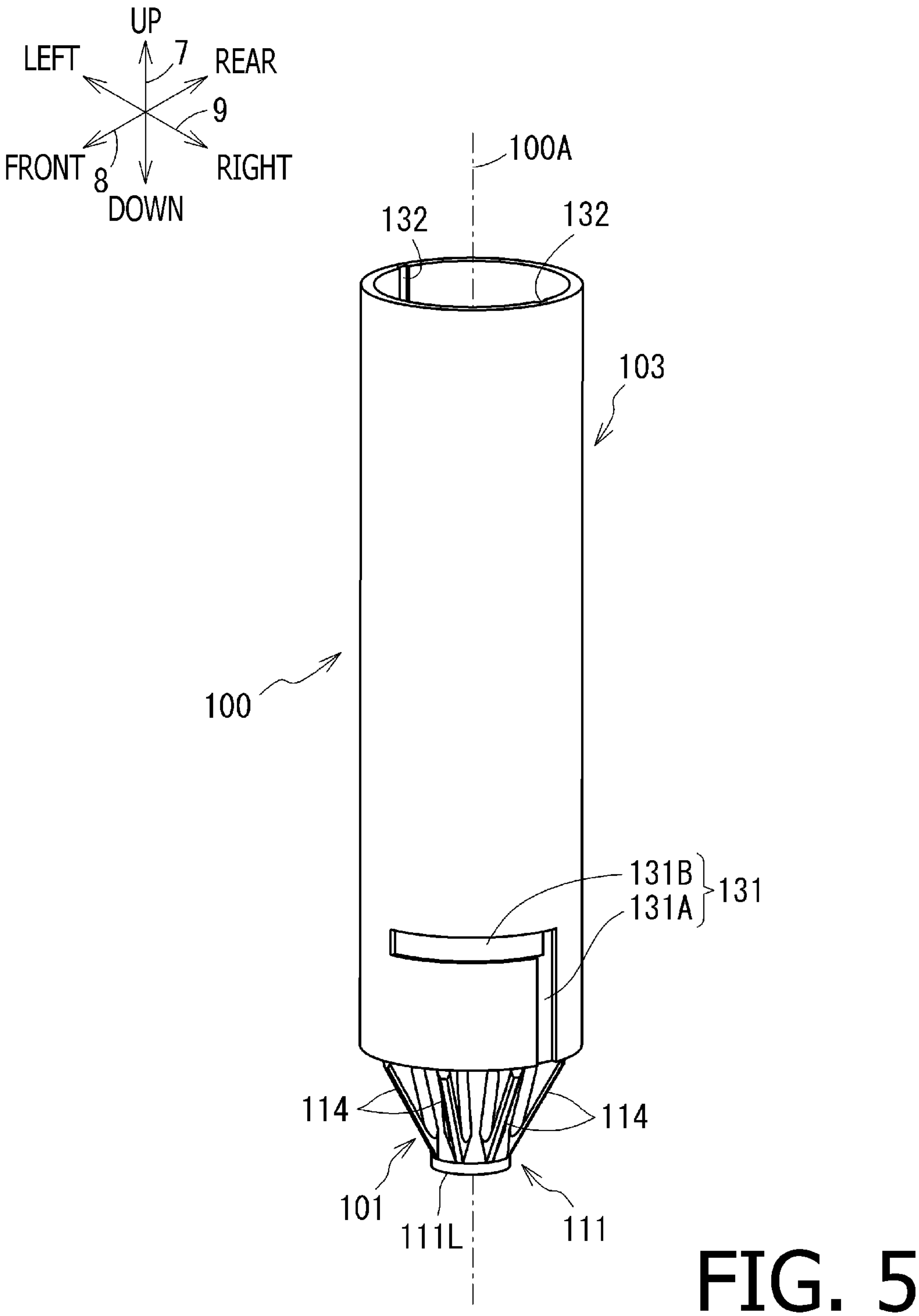
FIG. 5 is an external perspective view of a bottle.

Hereinafter, the bottle 100 will be described with reference to FIGS. 5 to 8. The bottle 100 stores ink. The bottle 100 supplies ink to the tank 80 through the injection port 83. As shown in FIGS. 5 and 6, the bottle 100 includes a nozzle member 101, a valve body 102, and a housing 103.

As shown in FIG. 5, an outer shape of the bottle 100 is a substantially cylindrical shape elongated in the up-down direction 7. While the bottle 100 is shown in FIGS. 5 to 7 with a supply port 113 facing downward, the bottle 100 may be placed with the supply port 113 facing upward during transportation and storage.

As shown in FIGS. 6 and 7, the nozzle member 101 is accommodated inside the housing 103, and a portion of the nozzle member 101 protrudes outward (downward in each figure) from the housing 103. The nozzle member 101 includes a nozzle portion 111 and an inserting portion 112.

An outer shape of the nozzle portion 111 is generally cylindrical, tapering downward. The supply port 113 opens to a lower end surface 111L of the nozzle portion 111. The supply port 113 is circular and communicates an internal space of the nozzle portion 111 with the outside. On an outer peripheral surface 111C of the nozzle portion 111, a plurality of elongated engaging ribs 114 extending in the up-down direction 7 are formed. The plurality of engaging ribs 114 are formed radially about the supply port 113. The engaging ribs 114 enter and engage with the grooves 86 of the tank 80, respectively. The number and arrangement of the engaging ribs 114 match the number and arrangement of the grooves 86.

The inserting portion 112 extends upward from an upper end surface 111U of the nozzle portion 111. The inserting portion 112 has a substantially cylindrical shape. An outer diameter of the inserting portion 112 is smaller than a diameter of the upper end surface 111U. Therefore, the upper end surface 111U is arranged around a lower end of the inserting portion 112. An axis of the nozzle portion 111 and an axis of the inserting portion 112 coincide with an axis 100A of the bottle 100. The inserting portion 112 is inserted into an internal space of the valve body 102. An internal space of the inserting portion 112 communicates with the internal space of the nozzle portion 111.

On an outer peripheral surface of the inserting portion 112, flat portions 115 each formed by cutting out a portion of the outer peripheral surface are provided at three locations around the axis 100A. Each flat portion 115 is a rectangle elongated in the up-down direction 7. A projection 116 protruding outward is formed on each flat portion 115. An outer shape of each projection 116 is substantially parallelogram when viewed along a radial direction of the inserting portion 112. The projections 116 are fitted into the guide grooves 124 of the valve body 102, respectively.

As shown in FIGS. 6 and 7, the valve body 102 is accommodated inside the housing 103. An outer shape of the valve body 102 is substantially cylindrical. An axis of the valve body 102 coincides with the axis 100A.

Figure 7A:
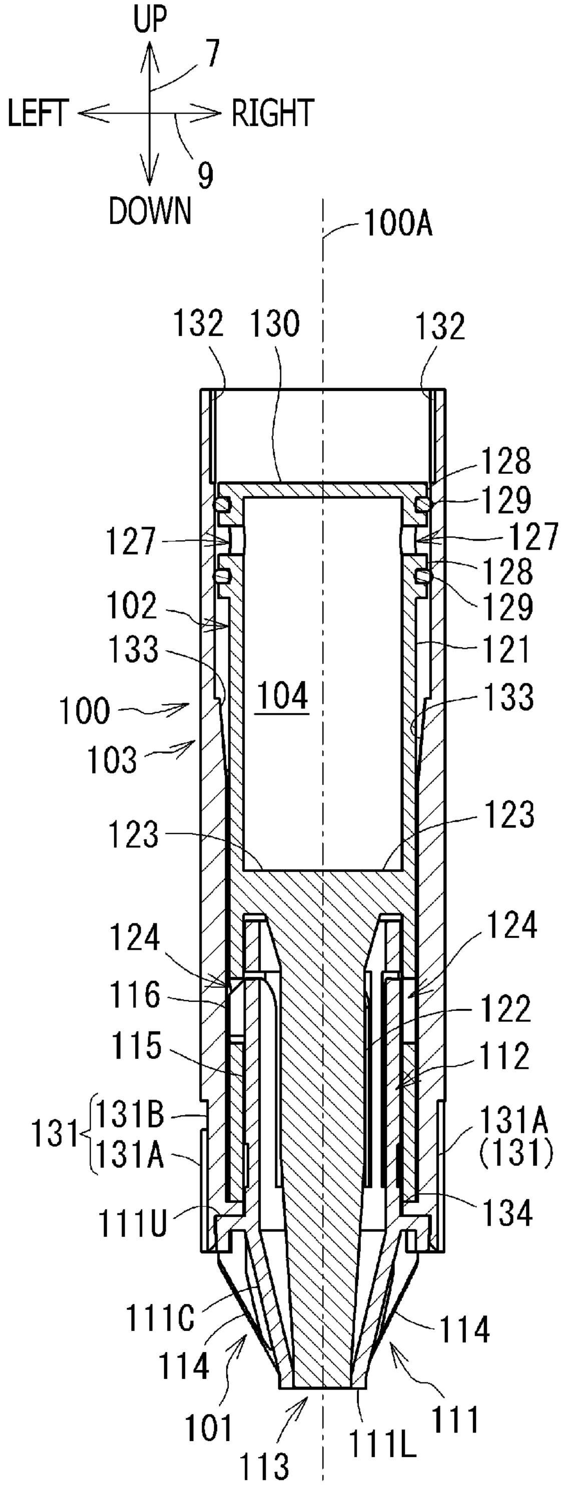
FIG. 7A is a cross-sectional view showing a cross section of the bottle in the first state along the up-down direction including an axis of the bottle.

As shown in FIG. 7, the valve body 102 includes a tube portion 121 having a cylindrical shape and a rod 122 arranged inside the tube portion 121. The rod 122 has a columnar shape and projects downward from a lower end of the tube portion 121. A dimension of the rod 122 in the up-down direction 7 is greater than a dimension of the nozzle member 101 in the up-down direction 7. An outer shape of a lower end of the rod 122 coincides with an inner diameter of the supply port 113 of the nozzle portion 111. As shown in FIG. 7A, the supply port 113 is closed by fitting the rod 122 into the supply port 113.

Figure 7B:
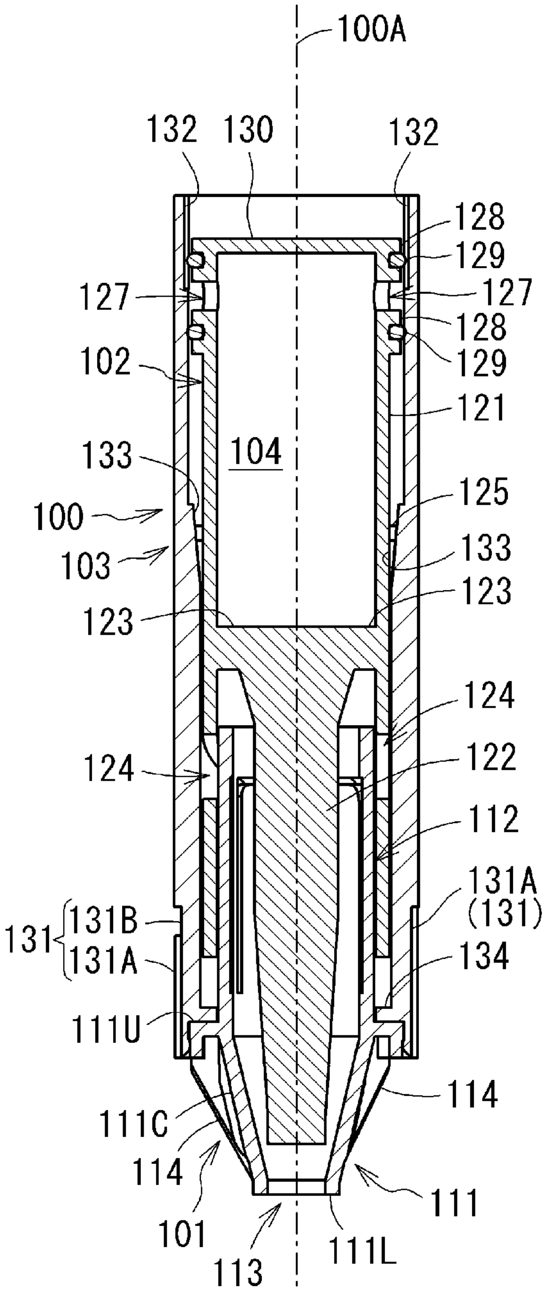
FIG. 7B is a cross-sectional view showing a cross section of the bottle in the second state along the up-down direction including the axis of the bottle.
Figure 8:
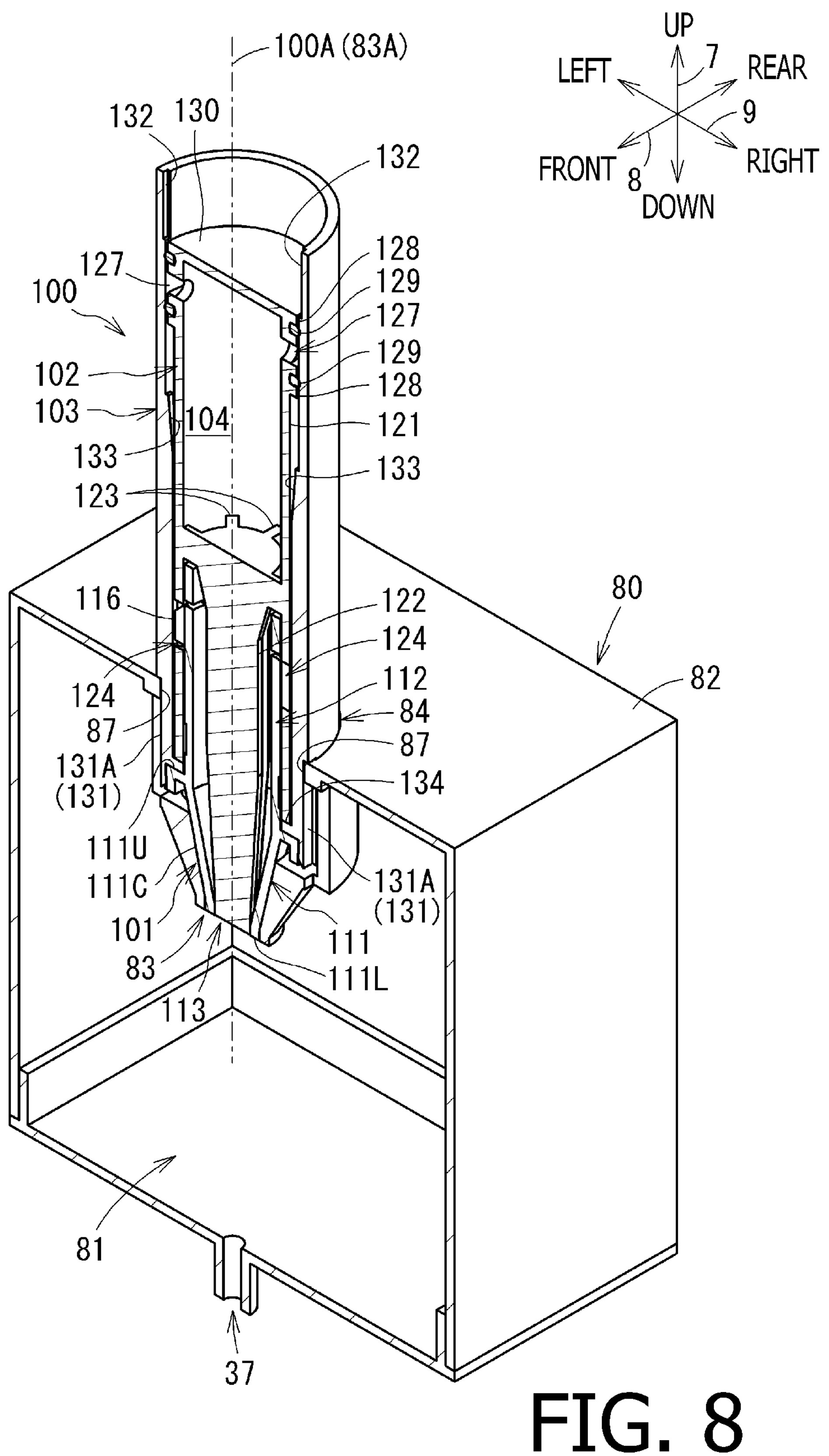
FIG. 8 is a cross-sectional view showing the bottle in the first state which is inserted into a recess of the tank.

As shown in FIGS. 7 and 8, an upper end of the rod 122 is connected to the tube portion 121 by a plurality of connecting portions 123. The plurality of connecting portions 123 are circumferentially spaced around the upper end of the rod 122. Spaces between adjacent connecting portions 123 are spaces through which ink can flow. The plurality of connecting portions 123 connect the rod 122 and the tube portion 121 so that an axis of the rod 122 coincides with the axis 100A. The rod 122 extending downward from the connecting portions 123 enters the internal spaces of the inserting portion 112 and the nozzle portion 111 from above the nozzle member 101.

As shown in FIG. 7, the tube portion 121 is inserted into an internal space of the housing 103. An outer diameter of the tube portion 121 is smaller than an inner diameter of the housing 103. As shown in FIGS. 6 and 7, the tube portion 121 includes guide grooves 124 that form parts of spiral shapes around the axis 100A. The guide grooves 124 are formed at three positions around the axis 100A and penetrate through the tube portion 121. In FIG. 6, each guide groove 124 is directed upward toward the right side. The projections 116 fit into the guide grooves 124, respectively. The valve body 102 and the nozzle member 101 are rotatable with respect to each other about the axis 100A in a state where the projections 116 are fitted into the guide grooves 124. By this relative rotation, each projection 116 can move to the vicinity of a right end or a left end of each guide groove 124.

Figure 6A:
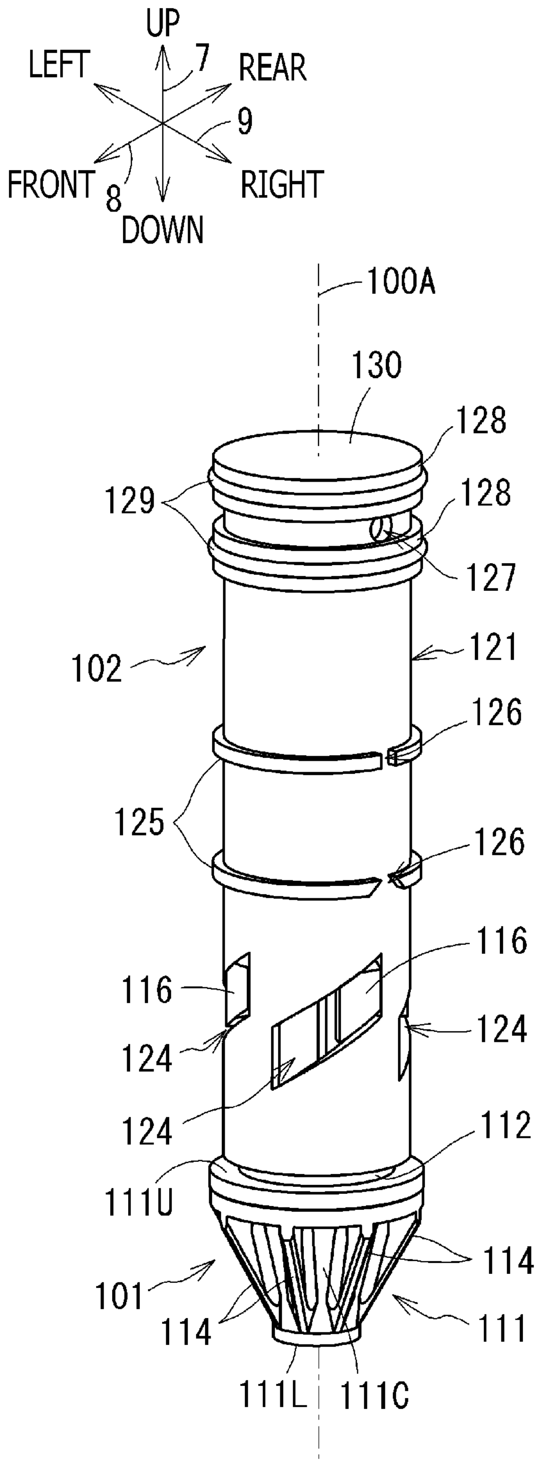
FIG. 6A is a perspective view showing a nozzle member and a valve body in a first state.

In a state where each projection 116 is positioned near the right end of each guide groove 124 as shown in FIG. 6A, as shown in FIG. 7A, the valve body 102 is in a state where it is moved downward with respect to the nozzle member 101 (hereinafter referred to as a first state), and the lower end of the rod 122 closes the supply port 113.

Figure 6B:
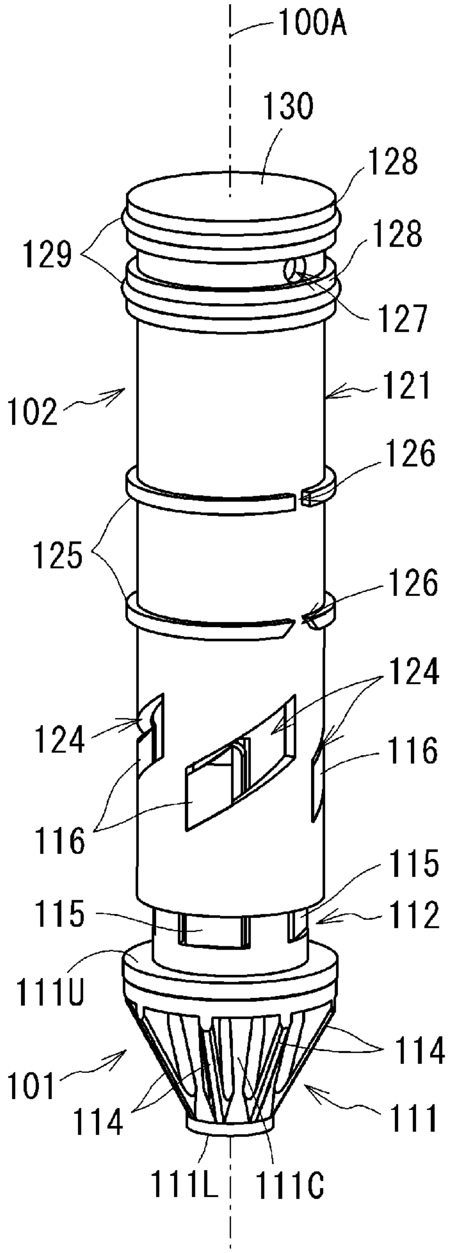
FIG. 6B is a perspective view showing the nozzle member and the valve body in a second state.

In a state where each projection 116 is positioned near the left end of each guide groove 124 as shown in FIG. 6B, as shown in FIG. 7B, the valve body 102 is in a state where it is moved upward with respect to the nozzle member 101 (hereinafter referred to as a second state), the lower end of the rod 122 is arranged above the supply port 113, and the supply port 113 is open.

As shown in FIG. 6, two annular ribs 125 extending annularly along the circumferential direction are formed on an outer peripheral surface of the tube portion 121. Each annular rib 125 projects outward from the outer peripheral surface of the tube portion 121. The two annular ribs 125 are arranged above the guide groove 124 with an interval in the up-down direction 7. Notches 126 are formed to each annular rib 125 at intervals of 180 degrees about the axis 100A. The notches 126 of the two annular ribs 125 form pairs in the up-down direction 7. A pair of notches 126 are aligned along the axis 100A and serve as a third groove. Guide rails 133 of the housing 103 fit into the pair of notches 126, respectively.

As shown in FIGS. 6 and 7, in the vicinity of an upper end of the outer peripheral surface of the tube portion 121, two through holes 127 communicating an internal space of the tube portion 121 with the outside are formed. The two through holes 127 are arranged at intervals of 180 degrees about the axis 100A.

Annular receiving portions 128 are formed on the outer peripheral surface of the tube portion 121 above and below the through holes 127. The receiving portions 128 project outward from the outer peripheral surface and support O-rings 129, respectively. The O-ring 129 is made of elastically deformable resin and is pressed against an inner peripheral surface of the housing 103. A space between the housing 103 and the tube portion 121 is hermetically and liquid-tightly sealed by the O-ring 129. The valve body 102 is supported on the housing 103 via the O-ring 129 so as to be slidable with respect to the housing 103 in the up-down direction 7.

An upper end of the tube portion 121 is closed by a plug portion 130. The internal space of the tube portion 121 and an internal space of the nozzle member 101 constitute a storage chamber 104 for storing ink.

As shown in FIGS. 5 and 7, an outer shape of the housing 103 is substantially cylindrical. An outer peripheral surface of the housing 103 (an outer surface around the axis 100A) is a cylindrical surface. A dimension of the housing 103 in the up-down direction 7 is greater than a dimension of the valve body 102 in the up-down direction 7. Therefore, the valve body 102 is accommodated in the internal space of the housing 103 and is movable along the up-down direction 7 in the internal space of the housing 103.

As shown in FIG. 5, two grooves 131 are formed on the outer peripheral surface of the housing 103. The two grooves 131 are arranged at intervals of 180 degrees about the axis 100A. Each groove 131 includes a first groove 131A that is open at a lower end surface of the housing 103 and extends in the up-down direction 7, and a second groove 131B that extends to the left in FIG. 5 along the circumferential direction from an upper end of the first groove 131A. The first groove 131A and the second groove 131B define a continuous space. The projections 87 of the tank 80 can enter the grooves 131.

As shown in FIGS. 5 and 7, two grooves 132 are formed on the inner peripheral surface of the housing 103. The two grooves 132 are arranged at intervals of 180 degrees about the axis 100A. Each groove 132 is open to an upper end surface of the housing 103 and extends in the up-down direction 7. As shown in FIG. 7A, a lower end of the groove 132 is arranged above the two O-rings 129 of the valve body 102 in the first state. As shown in FIG. 7B, the lower end of the groove 132 is arranged between the two O-rings 129 of the valve body 102 in the second state. The two grooves 132, together with the through holes 127 of the valve body 102, constitute an air communication passage that communicates the storage chamber 104 with the outside. Therefore, in the first state shown in FIG. 7A, the air communication passage is closed. In the second state shown in FIG. 7B, the air communication passage is open.

As shown in FIG. 7, two guide rails 133 are formed on the inner peripheral surface of the housing 103 below the grooves 132. The guide rails 133 are arranged at intervals of 180 degrees about the axis 100A. Each guide rail 133 projects inward from the inner peripheral surface of the housing 103 and extends linearly along the up-down direction 7. A circumferential dimension of each guide rail 133 is slightly smaller than a circumferential dimension of each notch 126. The guide rails 133 fit in the pair of notches 126 and guide the valve body 102 so as to be movable along the up-down direction 7.

As shown in FIG. 7, an annular projection 134 is formed near a lower end of the inner peripheral surface of the housing 103. The projection 134 is arranged slightly above the lower end surface of the housing 103. The projection 134 projects inward from the inner peripheral surface of the housing 103. An inner diameter of the annular projection 134 is slightly larger than the outer diameter of the inserting portion 112 of the nozzle member 101. The inserting portion 112 of the nozzle member 101 is inserted inside the projection 134 from the lower end of the housing 103. The upper end surface 111U of the nozzle portion 111 of the nozzle member 101 is in contact with the projection 134. The nozzle member 101 is positioned with respect to the housing 103 by the contact between the upper end surface 111U of the nozzle portion 111 and the projection 134. The outer peripheral surface 111C of the nozzle portion 111 and the inner peripheral surface of the housing 103 are in contact with each other. The housing 103 is rotatable with respect to the nozzle member 101 by the projection 134 sliding with respect to the upper end surface 111U of the nozzle portion 111 and the inner peripheral surface sliding with respect to the outer peripheral surface 111C of the nozzle portion 111. As shown in FIG. 7A, in the first state, the projection 134 is sandwiched between the nozzle portion 111 and the tube portion 121.

[Supply of Ink to Tank 80 from Bottle 100]

Hereinafter, a method of supplying ink to the tank 80 from the bottle 100 will be described below with reference to FIGS. 8 and 9.

When ink is discharged from the nozzles 39 of the head 38 and ink in the tank 80 is consumed, for example, in response to a notification indicating that a remaining amount of ink in the tank 80 is small, a user replenishes the tank 80 with ink. In order to replenish the tank 80 with ink, the user rotates an upper cover of the multifunction device 10 to expose the upper wall 82 of the tank 80 to the outside. Then, the user removes the lid 85 to expose the recess 84 to the outside.

The user prepares the bottle 100 in which ink is stored and inserts the nozzle portion 111 of the bottle 100 into the recess 84 of the tank 80 with the supply port 113 directed downward. At this time, the bottle 100 is in a state in which the rod 122 closes the supply port 113, that is, in the first state.

In inserting the nozzle portion 111, the user aligns the first grooves 131A of the housing 103 with the projections 87 of the recess 84. When positions of the first grooves 131A and the projections 87 match, the projections 87 can enter the first grooves 131A, and the bottle 100 can be inserted into the recess 84 with the projections 87 as guides.

As shown in FIG. 8, when the projections 87 reach upper ends of the first grooves 131A, the supply port 113 (lower end of the nozzle portion 111) of the bottle 100 fits into the injection port 83 of the tank 80, and the supply port 113 and the injection port 83 communicate with each other so that ink can flow therethrough. The engaging ribs 114 of the bottle 100 fit into the grooves 86 of the tank 80, respectively. In this state, the axis 83A and the axis 100A coincide with each other.

In the state shown in FIG. 8 (i.e., in the first state), the housing 103 can be rotated about the axis 100A with respect to the tank 80 using the projections 87 as guides. In other words, the grooves 131 allow the housing 103 to rotate in a state where the projections 87 are fitted. When the user rotates the housing 103 counterclockwise when viewed from the top, the projections 87 enter the second grooves 131B, respectively. Even if the housing 103 is rotated, since the engaging ribs 114 are fitted in the grooves 86, the nozzle member 101 is prevented from rotating with respect to the tank 80. That is, the nozzle member 101 does not rotate with the rotation of the housing 103. Accordingly, the housing 103 rotates counterclockwise with respect to the nozzle member 101.

Since the notches 126 are fitted to the guide rails 133, when the housing 103 is rotated, the valve body 102 rotates together with the housing 103. In other words, the valve body 102 also rotates counterclockwise with respect to the nozzle member 101. When the valve body 102 is rotated counterclockwise with respect to the nozzle member 101 from the first state shown in FIG. 6A, the valve body 102 is guided by the fitting between the projections 116 of the nozzle member 101 and the guide grooves 124 of the valve body 102, and slides upward with respect to the housing 103 while rotating with respect to the nozzle member 101.

Figure 9:
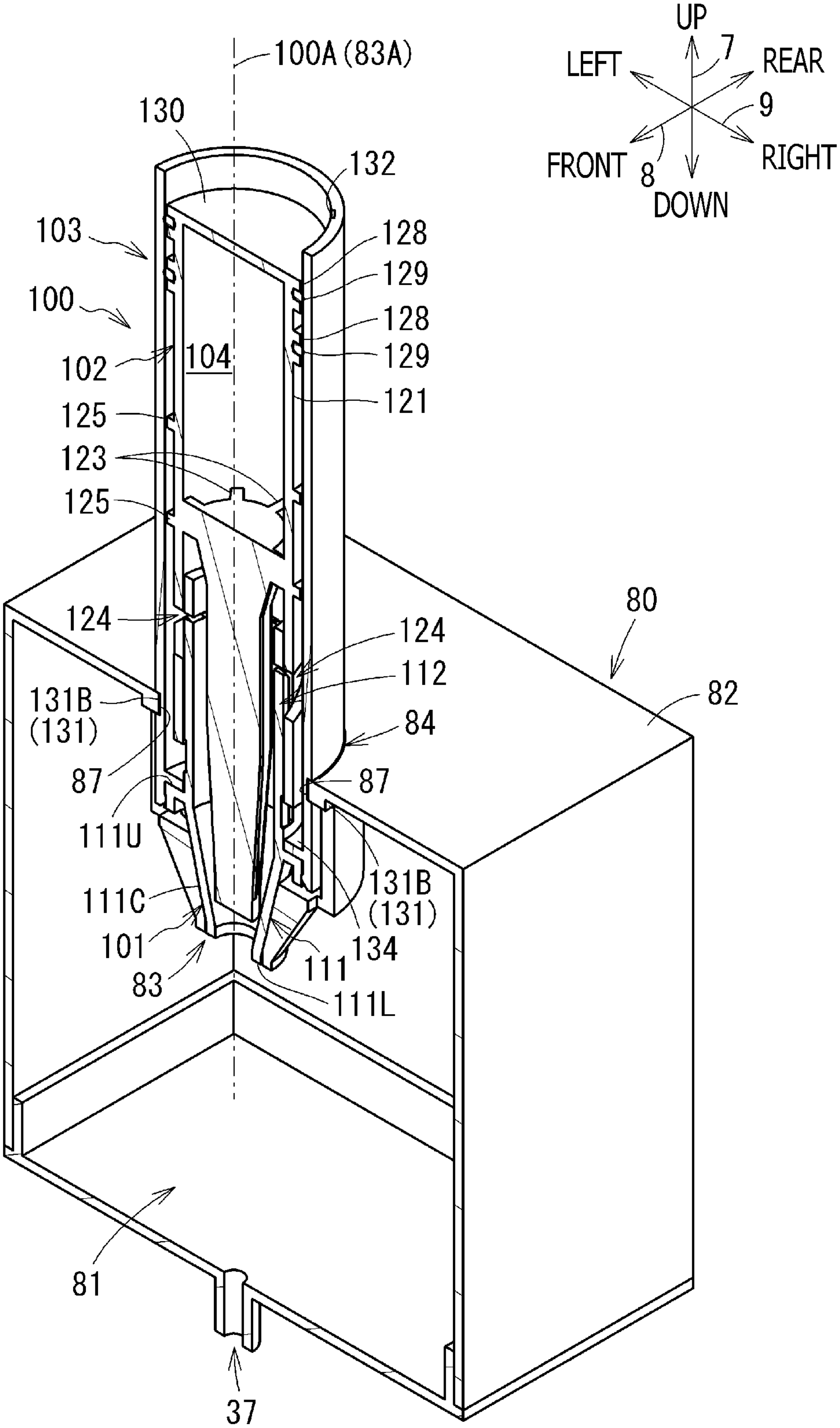
FIG. 9 is a cross-sectional view showing the bottle in the second state which is inserted into the recess of the tank.

Since the fitting between the notches 126 and the guide rails 133 does not prevent the valve body 102 from sliding in the up-down direction 7 with respect to the housing 103, the valve body 102 slides upward along the axis 100A in the internal space of the housing 103 while rotating together with the housing 103 and thereby moves to the second state shown in FIG. 9. In the process of changing the state of the bottle 100 from the first state to the second state, after the supply port 113 is opened, the air communication passage opens through the groove 132. In the second state, the projections 87 are in contact with the extending ends of the second grooves 131B.

As shown in FIG. 7B, in the second state, the lower ends of the grooves 132 of the housing 103 are between the two O-rings 129 in the up-down direction 7 and communicates with the through holes 127 of the valve body 102. As a result, the storage chamber 104 of the bottle 100 communicates with the outside through the through holes 127 and the grooves 132 and is atmospherically relieved. As shown in FIGS. 7B and 9, in the second state, the lower end of the rod 122 is positioned above the supply port 113 and thus the supply port 113 is open. As a result, ink stored in the storage chamber 104 flows down to the internal space 81 of the tank 80 through the supply port 113 and the injection port 83.

As shown in FIG. 9, in the second state, since the projections 87 of the tank 80 are in the second grooves 131B of the housing 103, the bottle 100 is prevented from moving upward with respect to the tank 80. That is, in the second state, the bottle 100 cannot be pulled out from the tank 80.

When the supply of ink from the bottle 100 to the tank 80 is completed, the user rotates the housing 103 clockwise with respect to the tank 80 from the second state shown in FIG. 9 to the first state shown in FIG. 8. Thus, the projections 87 of the tank 80 can enter the first grooves 131A of the housing 103, and the bottle 100 can move upward with respect to the tank 80. In the bottle 100 in the first state, since the rod 122 closes the supply port 113, even if ink remains in the storage chamber 104 of the bottle 100, ink does not flow out from the supply port 113 of the bottle 100 removed from the tank 80.

[Effects of Embodiment]

According to the above-described embodiment, in a state where the engaging ribs 114 of the nozzle member 101 are fitted into the grooves 86 of the tank 80, respectively, the housing 103 rotates with respect to the nozzle member 101 and the valve body 102 by operating only the housing 103. Further, the bottle 100 in the second state is prevented from being removed from the tank 80. The contact between the extending ends of the second grooves 131B of the nozzle member 101 and the projections 87 of the tank 80 restricts a rotation range of the housing with respect to the nozzle member 101 and the valve body 102.

[Variation]

In the above-described embodiment, by rotating the valve body 102 and the housing 103 with respect to the nozzle member 101, the rod 122 of the valve body 102 opens or closes the supply port 113 of the nozzle member 101, and the relative position between the O-rings 129 and the lower ends of the grooves 132 changes to open or close the air communication passage. However, the bottle 100 may not be provided with the air communication passage. In this case, ink may be discharged from the storage chamber 104 of the bottle 100 by, for example, a chicken feed system in which gas-liquid replacement is performed through flow paths. The chicken feed type bottle 150 will be described in detail below.

[Bottle 150]

Figure 10A:
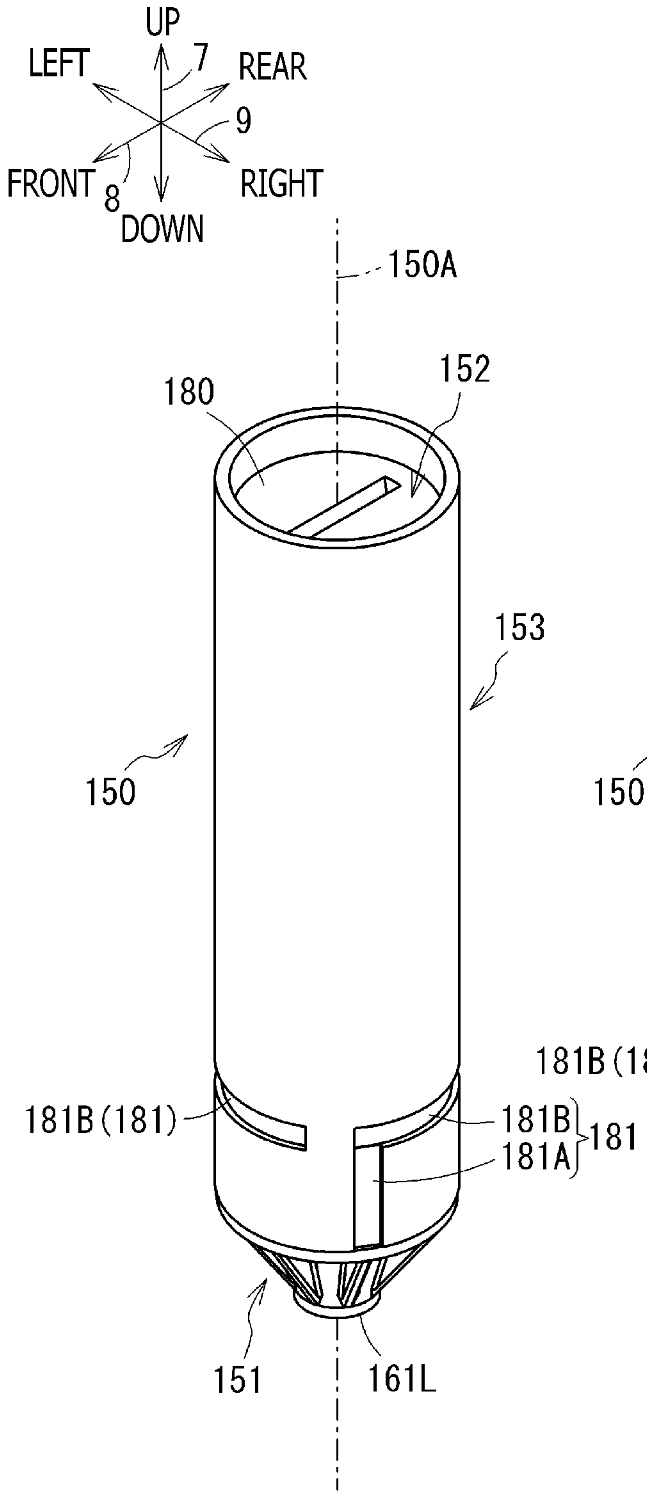
FIG. 10A is an external perspective view of a bottle.
Figure 10B:
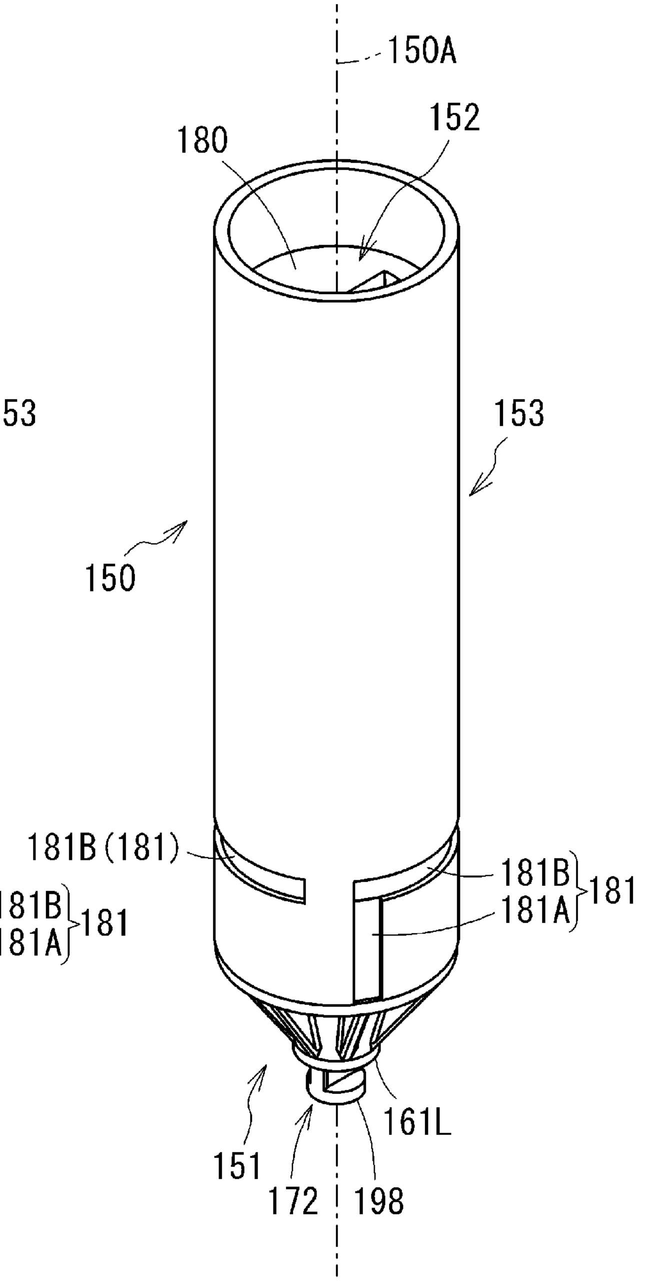
FIG. 10B is an external perspective view of the bottle.

Hereinafter, a bottle 150 will be described with reference to FIGS. 10-14. The bottle 150 is configured to store ink. The bottle 150 supplies ink to the tank 80 through the injection port 83. As shown in FIGS. 10 and 11, the bottle 150 includes a nozzle member 151, a valve body 152, and a housing 153.

As shown in FIG. 10, an outer shape of the bottle 150 is a substantially cylindrical shape elongated in the up-down direction 7. As shown in FIGS. 11 and 12, the nozzle member 151 is arranged inside the housing 153, and a portion thereof protrudes outward (downward in each figure) from the housing 153. The nozzle member 151 includes a nozzle portion 161 and an inserting portion 162.

An outer shape of the nozzle portion 161 is generally cylindrical, tapering downward. A supply port 163 opens to a lower end surface 161L of the nozzle portion 161. The supply port 163 is circular and communicates an internal space of the nozzle portion 161 with the outside. On an outer peripheral surface 161C of the nozzle portion 161, a plurality of elongated engaging ribs 164 extending in the up-down direction 7 are formed. The plurality of engaging ribs 164 are formed radially about the supply port 163. The engaging ribs 164 enter and engage with the grooves 86 of the tank 80, respectively. The number and arrangement of the engaging ribs 164 match the number and arrangement of the grooves 86.

The inserting portion 162 extends upward from an upper end surface 161U of the nozzle portion 161. The inserting portion 162 has a substantially cylindrical shape. An outer diameter of the inserting portion 162 is smaller than a diameter of the upper end surface 161U. Therefore, the upper end surface 161U is arranged around a lower end of the inserting portion 162. An axis of the nozzle portion 161 and an axis of the inserting portion 162 coincide with an axis 150A of the bottle 150. The inserting portion 162 is inserted into an internal space of the housing 153. An internal space of the inserting portion 162 communicates with the internal space of the nozzle portion 161.

As shown in FIGS. 11 and 12, the inserting portion 162 includes guide grooves 165 that form parts of spiral shapes around the axis 150A. The guide grooves 165 are formed at three positions around the axis 150A and penetrate through the inserting portion 162. In FIG. 11, each guide groove 165 is directed upward toward the right side. The projections 116 fit into the guide grooves 165, respectively. The valve body 152 and the nozzle member 151 are rotatable with respect to each other about the axis 150A in a state where the projections 174 are fitted into the guide grooves 165. By this relative rotation, each projection 174 can move to the vicinity of the right end or the vicinity of the left end of each guide groove 165.

As shown in FIGS. 11 and 12, the valve body 152 is arranged inside the nozzle member 151 and the housing 153. An outer shape of the valve body 152 is substantially cylindrical. The axis of valve body 152 coincides with the axis 150A.

Figure 12A:
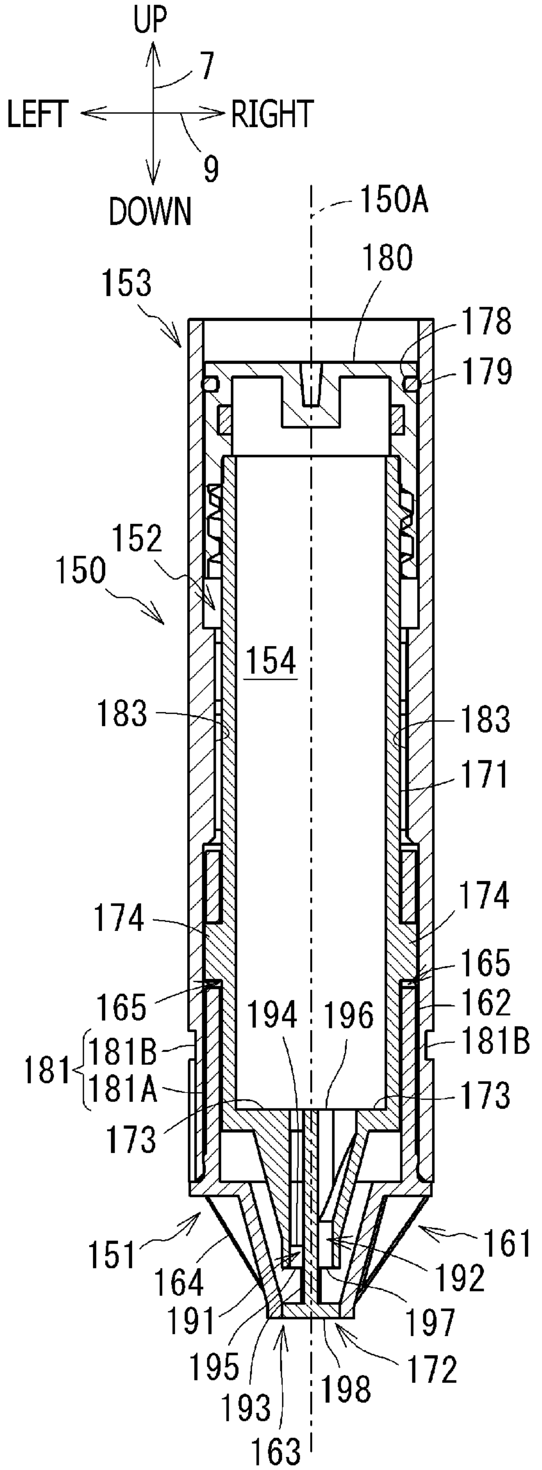
FIG. 12A is a cross-sectional view showing a cross section of the bottle in the first state along the up-down direction including an axis.

As shown in FIG. 12, the valve body 152 includes a tube portion 171 having a cylindrical shape and a valve 172 arranged inside the tube portion 171. The valve 172 has a columnar shape having a first flow path 191 and a second flow path 192 formed therein, and projects downward from a lower end of the tube portion 171. A dimension of the valve 172 in the up-down direction 7 is greater than a dimension of the nozzle member 151 in the up-down direction 7. An outer diameter of a lower end of the valve 172 coincides with the inner diameter of the supply port 163 of the nozzle portion 161. As shown in FIG. 12A, when the valve 172 fits into the supply port 163, the supply port 163 is closed.

Figure 12B:
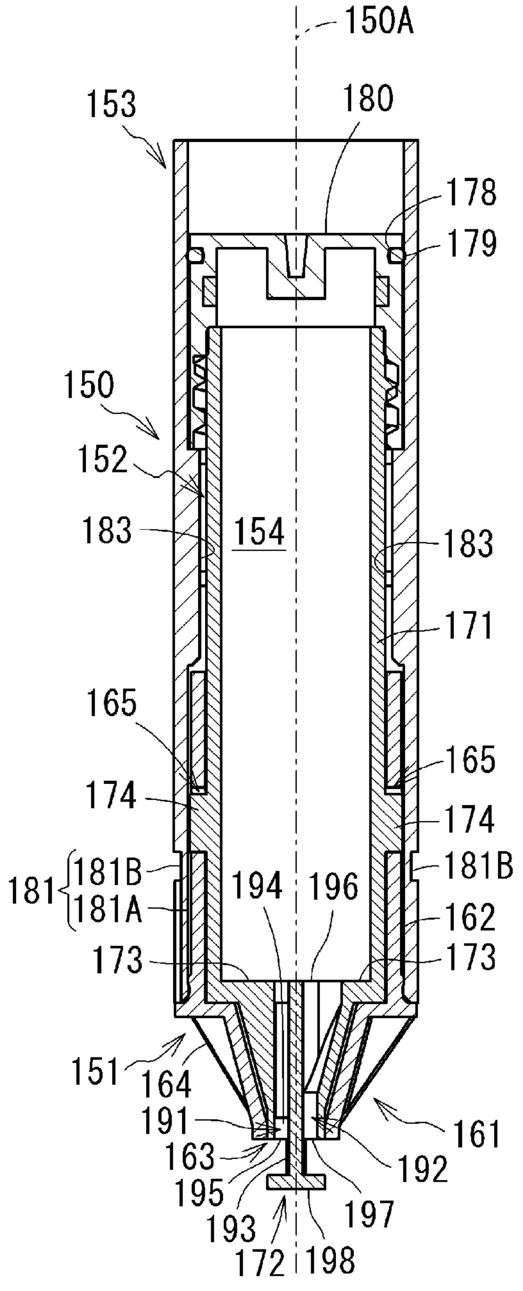
FIG. 12B is a cross-sectional view showing a cross section of the bottle in the second state along the up-down direction including the axis.
Figure 13:
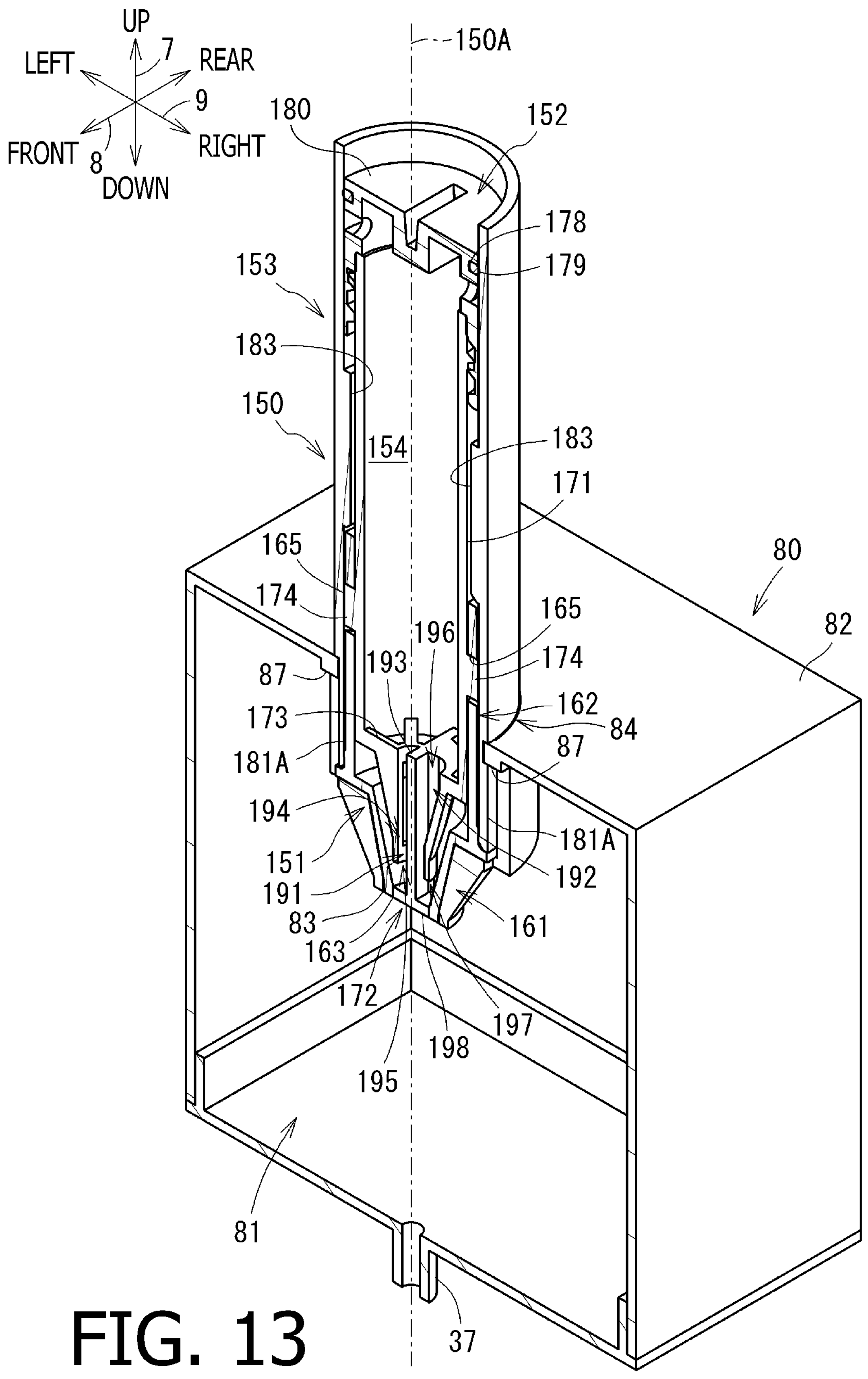
FIG. 13 is a cross-sectional view showing a state in which the bottle in the first state is inserted into the recess of the tank.

As shown in FIGS. 12 and 13, an upper end of the valve 172 is connected to the tube portion 171 by a plurality of connecting portions 173. The plurality of connecting portions 173 are circumferentially spaced around the upper end of the valve 172. Spaces between adjacent connecting portions 173 are spaces through which ink can flow. The plurality of connecting portions 173 connect the valve 172 and the tube portion 171 so that an axis of the valve 172 coincides with the axis 150A. The valve 172 extending downward from the connecting portions 173 enters the internal spaces of the inserting portion 162 and the nozzle portion 161 from above the nozzle member 151.

As shown in FIG. 12, the valve 172 has a first flow path 191 and a second flow path 192 extending along the axis 150A. The first flow path 191 and the second flow path 192 are partitioned by a peripheral wall of the valve 172 and a partition wall 193. In the present embodiment, the first flow path 191 and the second flow path 192 extend along the axis 150A. However, the present disclosure is not limited to such configuration and, for example, the first flow path 191 and the second flow path 192 may be curved.

A length of the first flow path 191 along an ink flow direction (in this embodiment, along the axis 150A) is longer than a length of the second flow path 192 along the ink flow direction. The first flow path 191 and the second flow path 192 have the same shape and size except for the above-mentioned length difference. A cross-sectional area of a cross section of the first flow path 191 perpendicular to the axis 151A is the same as a cross-sectional area of a cross section of the second flow path 192 perpendicular to the axis 150A. In the present embodiment, shapes of the cross section of the first flow path 191 and the second flow path 192 are both semicircular. It should be noted that the shapes of the cross sections of the first flow path 191 and the second flow path 192 may be shapes other than semicircular shapes.

Further, the shape of the cross section of the first flow path 191 may be different from the shape of the cross section of the second flow path 192, and the cross-sectional area of the first flow path 191 may be different from the cross-sectional area of the second flow path 192.

One end of the first flow path 191 communicates with a storage chamber 154 through an opening 194. An opening 195, which is the other end of the first flow path 191, is arranged at a distal end portion (lower end in each figure) of the valve 172. One end of the second flow path 192 communicates with the storage chamber 154 through an opening 196. An opening 197, which is the other end of the second flow path 192, is arranged at a distal end portion (lower end in each figure) of the valve 172. In this embodiment, the storage chamber 154 and the outside of the bottle 150 communicate with each other only by the first flow path 191 and the second flow path 192.

As shown in FIG. 12, the opening 194 is arranged above the opening 196 when the distal end of the valve 172 positioned near the supply port 163 is facing downward. The opening 195 and the opening 197 are arranged at the same position in the up-down direction 7.

The opening 194 is arranged at a proximal end of the valve 172, which is connected to the tube portion 171 by the connecting portions 173, and opens only into an internal space of the tube portion 171. The opening 196 is arranged between the distal end and the proximal end of the valve 172 and opens into an internal space of the tube portion 171 and also opens into an internal space of the nozzle member 151 through the connecting portions 173.

The partition wall 193 extends below (lower side in FIG. 12) the openings 195 and 197. A disk 198 is coupled to a lower end of the partition wall 193. An axis of the disk 198 coincides with the axis 150A. An outer diameter of the disk 198 matches an inner diameter of the supply port 163 of the nozzle member 151. The supply port 163 is liquid-tightly closed by the disk 198 fitted into the supply port 163.

As shown in FIG. 12, the tube portion 171 is inserted into the internal space of the housing 153. An outer diameter of the tube portion 171 is smaller than an inner diameter of the housing 153. A lower portion of the tube portion 171 is also inserted into the inserting portion 162 of the nozzle member 151. The outer diameter of the tube portion 171 is smaller than an inner diameter of the inserting portion 162.

The projections 174 projecting outward are arranged on an outer peripheral surface of the tube portion 171. Each projection 174 has a substantially parallelogram outer shape when viewed along a radial direction of the inserting portion 162. The projections 174 are fitted into the guide grooves 165 of the nozzle member 151, respectively.

Figure 11A:
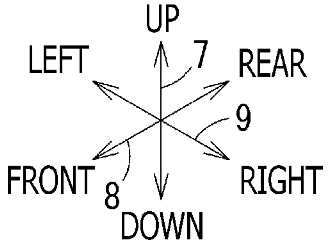
FIG. 11A is a perspective view showing a nozzle member and a valve body in a first state.
Figure 11A:
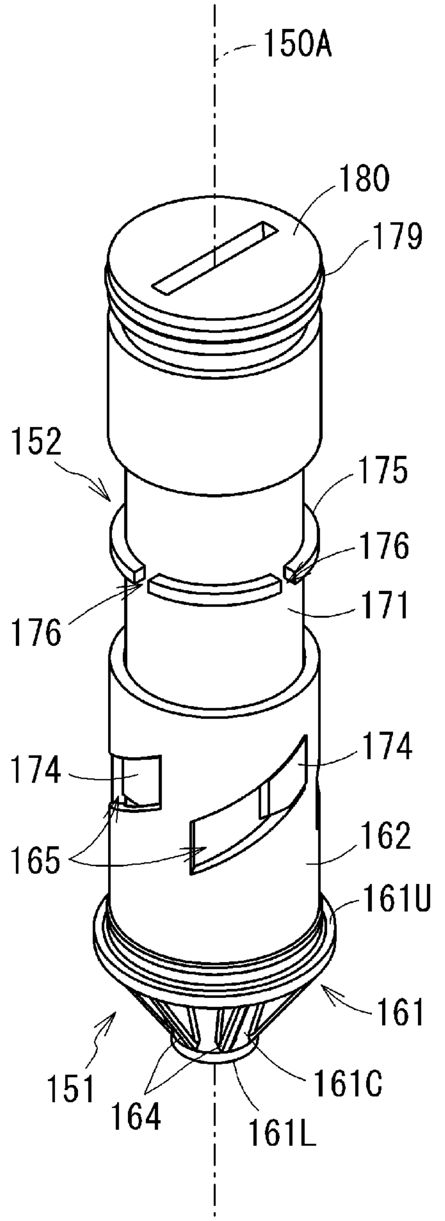

As shown in FIG. 11A, in a state where each projection 174 is positioned near the right end of each guide groove 165, as shown in FIG. 12A, the valve body 152 is in a state where it is moved upward with respect to the nozzle member 151 (hereinafter referred to as the first state), and the disk 198 of the valve 172 closes the supply port 163. In this state, openings 195 and 197 are within the storage chamber 154 and are not exposed to the outside of the bottle 150.

Figure 11B:
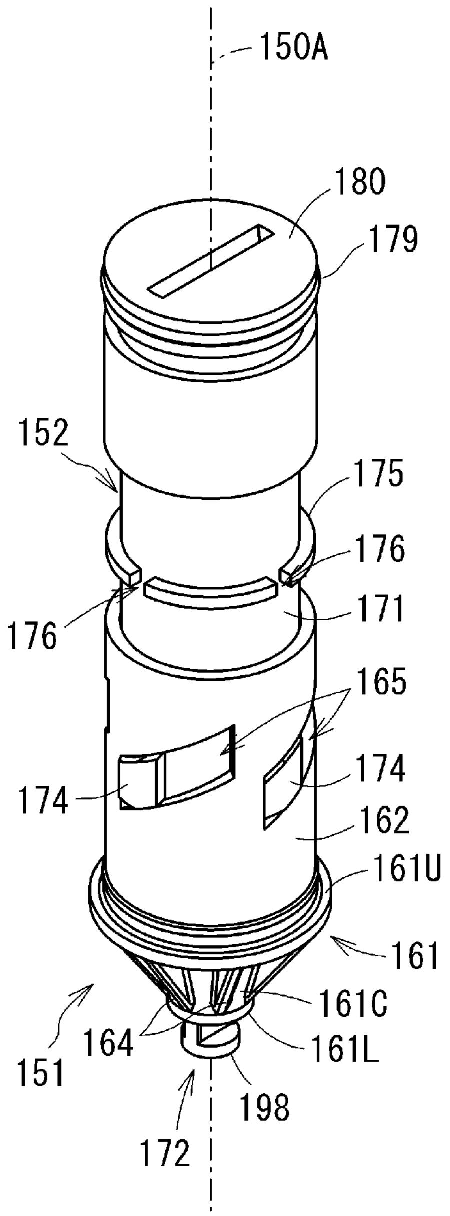
FIG. 11B is a perspective view showing the nozzle member and the valve body in a second state.

As shown in FIG. 11B, in a state where each projection 174 is positioned near the left end of each guide groove 165, as shown in FIG. 12B, the valve body 152 is in a state where it is moved downward with respect to the nozzle member 151 (hereinafter referred to as the second state), and the disk 198 of the valve 172 is positioned below the supply port 163. In this state, the distal end portion of the valve 172 protrudes from the supply port 163 to the outside, and the openings 195 and 197 are exposed to the outside. As a result, the supply port 163 opens through the first flow path 191 and the second flow path 192 of the valve 172.

As shown in FIG. 11, an annular rib 175 extending annularly along the circumferential direction is formed on the outer peripheral surface of the tube portion 171. The annular rib 175 projects outward from the outer peripheral surface of the tube portion 171. The annular rib 175 is arranged above the projections 174. Notches 176 are formed to the annular rib 175 at intervals of 90 degrees about the axis 150A. Guide rails 183 of the housing 153 fits into the notches 176.

An upper end of the tube portion 171 is closed by a plug member 180. The plug member 180 is screwed to the upper end of the tube portion 171. The internal space of the tube portion 171 and the internal space of the nozzle member 151 constitute the storage chamber 154 in which ink is to be stored.

A groove 178 extending in the circumferential direction is formed on an outer peripheral surface of the plug member 180. The groove 178 supports an O-ring 179. The O-ring 179 is made of elastically deformable resin and is pressed against an inner peripheral surface of the housing 153. A space between the housing 153 and the tube portion 171 is hermetically and liquid-tightly sealed by the O-ring 179. Further, the valve body 152 is supported on the housing 153 via the O-ring 179 so as to be slidable with respect to the housing 153 in the up-down direction 7.

As shown in FIGS. 10 and 12, an outer shape of the housing 153 is substantially cylindrical. An outer surface of the housing 153 around the axis 150A is a cylindrical surface. A dimension of the housing 153 in the up-down direction 7 is greater than a dimension of the valve body 152 in the up-down direction 7. Therefore, the valve body 152 is accommodated in the internal space of the housing 153 and can move in the up-down direction 7 within the internal space of the housing 153.

As shown in FIG. 10, two grooves 181 are formed on the outer peripheral surface of the housing 153. The two grooves 181 are arranged at intervals of 180 degrees about the axis 150A. Each groove 181 includes a first groove 181A that is open at a lower end surface of the housing 153 and extends in the up-down direction 7, and a second groove 181B that extends to the left in FIG. 10 along the circumferential direction from an upper end of the first groove 181A. The first groove 181A and the second groove 181B define a continuous space. The projections 87 of the tank 80 can enter the grooves 181.

As shown in FIG. 12, four guide rails 183 are formed on the inner peripheral surface of the housing 153. The guide rails 183 are arranged at intervals of 90 degrees about the axis 150A. Each guide rail 183 projects inward from the inner peripheral surface of the housing 153 and extends linearly along the up-down direction 7. A circumferential dimension of each guide rail 183 is slightly smaller than a circumferential dimension of each notch 176. The guide rails 183 fit into the notches 176, respectively, and guide the valve body 152 so as to be movable in the up-down direction 7.

The upper end surface 151U of the nozzle portion 161 of the nozzle member 151 is in contact with the lower end surface of the housing 153. The nozzle member 151 is positioned with respect to the housing 153 by the contact between the upper end surface 161U of the nozzle portion 161 and the lower end surface of the housing 153. An outer peripheral surface of the inserting portion 162 and the inner peripheral surface of the housing 153 are in contact with each other. The housing 153 can be rotated with respect to the nozzle member 151 by the lower end surface sliding with respect to the upper end surface 161U of the nozzle portion 161 and the inner peripheral surface sliding with respect to the outer peripheral surface of the inserting portion 162.

[Supply of Ink to Tank 80 from Bottle 150]

Hereinafter, a method of supplying ink to the tank 80 from the bottle 150 will be described below with reference to FIGS. 13 and 14.

When ink is discharged from the nozzles 39 of the head 38 and ink in the tank 80 is consumed, for example, in response to the notification indicating that the remaining amount of ink in the tank 80 is small, the user replenishes the tank 80 with ink. In order to replenish the tank 80 with ink, the user rotates the upper cover of the multifunction device 10 to expose the upper wall 82 of the tank 80 to the outside. Then, the user removes the lid 85 to expose the recess 84 to the outside.

The user prepares the bottle 150 in which ink is stored and inserts the nozzle portion 161 of the bottle 150 into the recess 84 of the tank 80 with the supply port 163 directed downward. At this time, the bottle 150 is in a state in which the valve 172 closes the supply port 163, that is, in the first state.

In inserting the nozzle portion 161, the user aligns the first grooves 181A of the housing 153 with the projections 87 of the recess 84. When positions of the first grooves 181A and the projections 87 match, the projections 87 can enter the first grooves 181A, and the bottle 150 can be inserted into the recess 84 with the projections 87 as the guides.

As shown in FIG. 13, when the projections 87 reach upper ends of the first grooves 181A, the supply port 163 (lower end of the nozzle portion 161) of the bottle 150 fits into the injection port 83 of the tank 80, and the supply port 163 and the injection port 83 communicate with each other so that ink can flow therethrough. The engaging ribs 164 of the bottle 150 fit into the grooves 86 of the tank 80, respectively. In this state, the axis 83A and the axis 150A coincide with each other.

In the state shown in FIG. 13 (i.e., in the first state), the housing 153 can be rotated about the axis 150A with respect to the tank 80 using the projections 87 as guides. When the user rotates the housing 153 clockwise when viewed from the top, the projections 87 enter the second grooves 181B, respectively. In other words, the second grooves 181B allow the housing 153 to rotate. Even if the housing 153 is rotated, since the engaging ribs 164 are fitted in the grooves 86, the nozzle member 151 is prevented from rotating with respect to the tank 80. That is, the nozzle member 151 does not rotate with the rotation of the housing 153. Accordingly, the housing 153 rotates clockwise with respect to the nozzle member 151.

Since the notches 176 are fitted to the guide rails 183, when the housing 153 is rotated, the valve body 152 rotates together with the housing 153. In other words, the valve body 152 also rotates clockwise with respect to the nozzle member 151. When the valve body 152 is rotated clockwise with respect to the nozzle member 151 from the first state shown in FIG. 11A, the valve body 152 is guided by the fitting between the guide grooves 165 of the nozzle member 151 and the projections 174 of the valve body 152, and slides downward with respect to the housing 153 while rotating with respect to the nozzle member 151.

Figure 14:
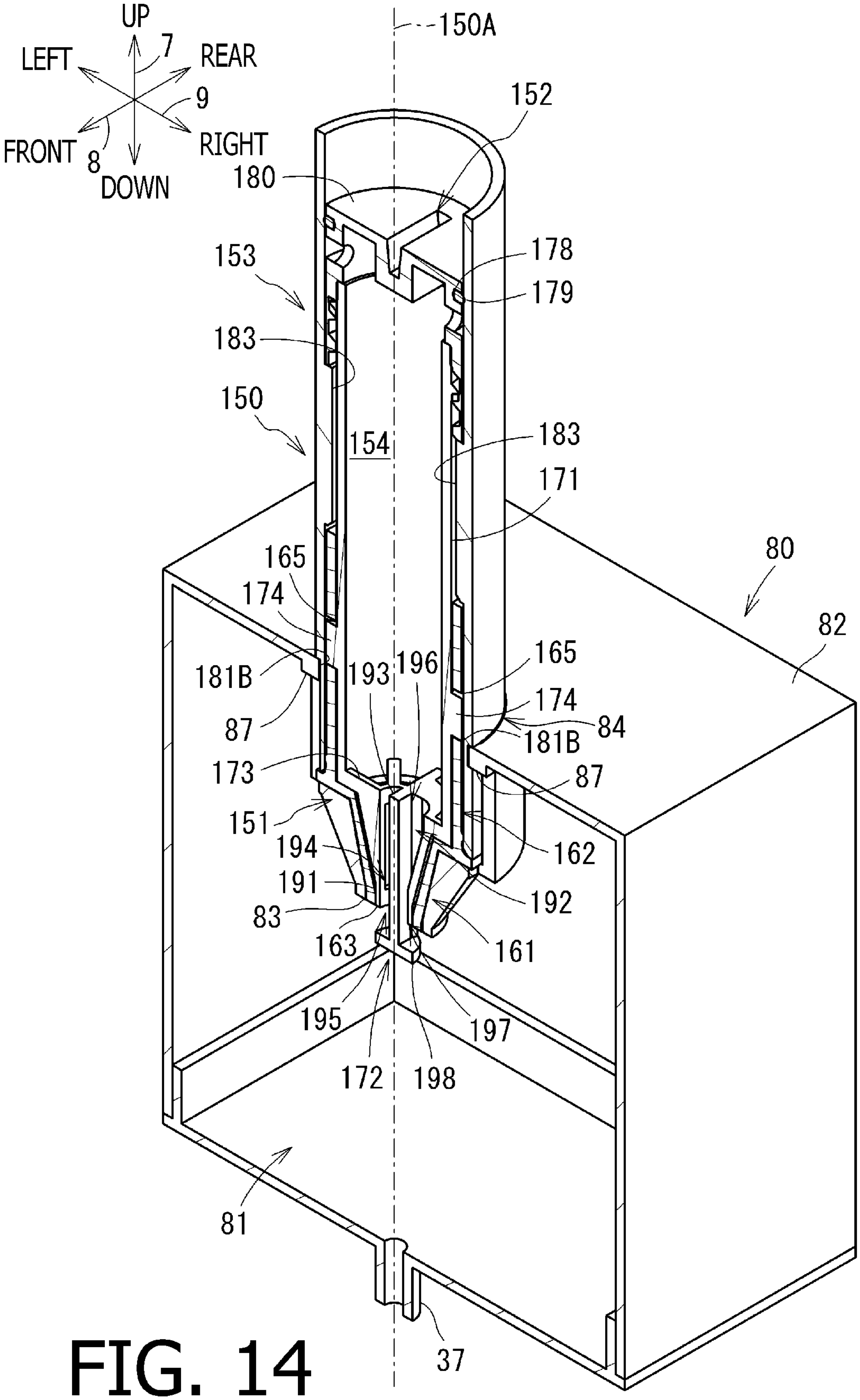
FIG. 14 is a cross-sectional view showing a state in which the bottle in the second state is inserted into the recess of the tank.

Since the fitting between the notches 176 and the guide rails 183 does not prevent the valve body 152 from sliding in the up-down direction 7 with respect to the housing 153, the valve body 152 slides downward along the axis 150A in the internal space of the housing 153 while rotating together with the housing 153 and thereby moves to the second state shown in FIG. 14. In the second state, the projections 87 are in contact with the extending ends of the second grooves 181B.

As shown in FIGS. 12B and 14, in the second state, since the disk 198 of the valve 172 is positioned below the supply port 163, the supply port 163 is open. Further, the openings 195 and 197 are arranged in the internal space 81 of the tank 80, and the storage chamber 154 and the internal space 81 communicate with each other through the first flow path 191 and the second flow path 192.

Since the opening 194 is arranged above the opening 196, there is a hydraulic head pressure between the opening 194 and the opening 196. As a result, ink stored in the storage chamber 154 flows into the first flow path 191 through the opening 194, and flows into the internal space 81 through the opening 195.

When ink flows, the air in the internal space 81 flows into the storage chamber 154 through the second flow path 192. A volume of ink flowing from the storage chamber 154 to the internal space 81 and a volume of air flowing from the internal space 81 to the storage chamber 154 are substantially the same. In this manner, so-called gas-liquid replacement is performed. When all the ink in the storage chamber 154 of the bottle 150 flows into the internal space 81 of the tank 80, the gas-liquid replacement ends.

As shown in FIG. 14, in the second state, since the projections 87 of the tank 80 are in the second grooves 181B of the housing 153, the bottle 150 is prevented from moving upward with respect to the tank 80. That is, in the second state, the bottle 150 cannot be pulled out from the tank 80.

When the supply of ink from the bottle 150 to the tank 80 is completed, the user rotates the housing 153 counterclockwise with respect to the tank 80 from the second state shown in FIG. 14 to the first state shown in FIG. 8. Thus, the projections 87 of the tank 80 can enter the first grooves 181A of the housing 153, and the bottle 150 can move upward with respect to the tank 80. In the bottle 150 in the first state, since the disk 198 closes the supply port 163, even if ink remains in the storage chamber 154 of the bottle 150, ink does not flow out from the supply port 163 of the bottle 150 removed from the tank 80.

[Other Variations]

In the above-described embodiment, the nozzle member 101 includes the engaging ribs 114 and the tank 80 includes the grooves 86. However, since the engaging ribs 114 and the grooves 86 are in pairs, it is sufficient if one of the nozzle member 101 and the tank 80 is provided with the engaging ribs 114 and the other is provided with the grooves 86. Further, the shapes and arrangements of the engaging ribs 114 and the grooves 86 are not limited to those extending radially around the supply port 113. For example, a pair of boss and recess which can be fitted to each other may be formed at only one place around the supply port 113.

In the above-described embodiment, the nozzle member 101 has the engaging ribs 114 for preventing rotation and the housing 103 has the grooves 131 for allowing rotation. However, since the engaging ribs 114 and the grooves 131 are in pairs, the engaging ribs 114 may be provided to the housing 103 and the grooves 131 may be provided to the nozzle member 101. Further, the projections 87 of the tank 80 may not be in contact with the extending ends of the second grooves 131B when the bottle 100 is in the second state. In place of the projections 134 of the housing 103, projections may project outward from the vicinity of the lower end of the inserting portion 112 of the nozzle member 101.

The valve body 102 and the housing 103 do not necessarily have to be separate members but may be formed as one member. The shape of the supply port 113 is not limited to a circular shape but may be other shapes such as an elliptical shape or a rectangular shape. The air communication passage is not limited to the passage formed by the through hole 127 and the groove 132.

In the tank 80, the injection port 83 and the recess 84 may be formed on other than the upper wall 82. For example, the injection port 83 and the recess 84 may be formed on an outer surface of the tank 80 and on an inclined wall inclined with respect to the up-down direction 7. The tank 80 does not necessarily need to be mounted on the carriage 40, and the head 38 and the tank 80 may be connected to each other by a tube or the like so that ink can flow therethrough.

In the above-described embodiments, ink has been described as an example of a printing liquid. However, the printing liquid is not limited to ink. For example, the printing liquid may be a pretreatment liquid that is ejected onto the recording sheet prior to the ink at the time of printing, water that is sprayed to prevent the nozzles 39 of the head 38 from drying, or the like.

The groove 86 and the projection 87 in the above-described embodiments are examples of a fitting portion according to aspects of the present disclosures. The bottles 100 and 150 in the above-described embodiments are examples of a printing liquid container according to aspects of the present disclosures. The nozzle members 101 and 151 in the above-described embodiments are examples of a first member according to aspects of the present disclosures. The valve bodies 102 and 152 and the housings 103 and 153 in the above-described embodiments are examples of a second member according to aspects of the present disclosures. The engaging ribs 114 and 164 in the above-described embodiments are examples of a first fitting portion and a first projection according to aspects of the present disclosures. The rod 122 and the valve 172 in the above-described embodiments are examples of a valve according to aspects of the present disclosures. The grooves 131 and 181 in the above-described embodiments are examples of a second fitting portion according to aspects of the present disclosures. The first grooves 131A and 181A in the above-described embodiments are examples of a second groove according to aspects of the present disclosures. The second groove 131B in the above-described embodiments is an example of a third groove according to aspects of the present disclosures. The up-down direction 7 in the above-described embodiments is an example of a first direction according to aspects of the present disclosures. The circumferential direction in the above-described embodiments is an example of a second direction according to aspects of the present disclosures.

What is claimed is:

1. A printing liquid container configured to fit to a tank including a fitted portion having an injection port, the printing liquid container comprising:

a first member having a supply port communicating with an internal space of the first member; and a second member having a valve configured to open or close the supply port, wherein:

the first member and the second member are coupled to each other so as to be rotatable with respect to each other between a first state and a second state, the internal space of the first member and an internal space of the second member constitute a storage chamber configured to store liquid, the valve closes the supply port in the first state and opens the supply port in the second state, one of the first member and the second member has a first fitting portion configured to fit to the fitted portion, an other of the first member and the second member has a second fitting portion configured to fit to the fitted portion, the first fitting portion and the second fitting portion fit to the fitted portion in the first state, the second fitting portion allows rotation of the other of the first member and the second member with respect to the fitted portion in a state where the fitted portion and the first fitting portion are fitted to each other, the one of the first member and the second member does not rotate together with the rotation of the other of the first member and the second member due to fitting between the fitted portion and the first fitting portion, and the other of the first member and the second member cannot be removed from the fitted portion due to fitting between the fitted portion and the second fitting portion in the second state.

2. The printing liquid container according to claim 1, wherein:

the first member includes the first fitting portion, and the second member includes the second fitting portion.

3. The printing liquid container according to claim 2, wherein the first fitting portion is a first projection or a first groove extending radially from a periphery of the supply port.

4. The printing liquid container according to claim 2, wherein the second fitting portion includes:

a second groove extending on an outer surface of the second member in a first direction along an axis of relative rotation; and a third groove extending on the outer surface of the second member from the second groove in a second direction intersecting the first direction.

5. The printing liquid container according to claim 4, wherein an extending end of the third groove is in contact with the fitted portion in the second state.

6. The printing liquid container according to claim 4, wherein the second member has a cylindrical shape.

7. The printing liquid container according to claim 1, wherein:

the second member has an outside air communication passage that communicates the internal space of the second member with the outside air, and the air communication passage is closed in the first state and is open in the second state.

8. A system including a printing liquid container and a tank, wherein the tank comprises a fitted portion having an injection port, and wherein the printing liquid container comprises:

a first member having a supply port communicating with an internal space of the first member; and a second member having a valve configured to open or close the supply port, wherein:

the first member and the second member are coupled to each other so as to be rotatable with respect to each other between a first state and a second state, the internal space of the first member and an internal space of the second member constitute a storage chamber configured to store liquid, the valve closes the supply port in the first state and opens the supply port in the second state, one of the first member and the second member has a first fitting portion configured to fit to the fitted portion, an other of the first member and the second member has a second fitting portion configured to fit to the fitted portion, the first fitting portion and the second fitting portion fit to the fitted portion in the first state, the second fitting portion allows rotation of the other of the first member and the second member with respect to the fitted portion in a state where the fitted portion and the first fitting portion are fitted to each other, the one of the first member and the second member does not rotate together with the rotation of the other of the first member and the second member due to fitting between the fitted portion and the first fitting portion, and the other of the first member and the second member cannot be removed from the fitted portion due to fitting between the fitted portion and the second fitting portion in the second state.

9. The system according to claim 8, wherein:

the first member includes the first fitting portion, and the second member includes the second fitting portion.

10. The system according to claim 9, wherein the first fitting portion is a first projection or a first groove extending radially from a periphery of the supply port.

11. The system according to claim 9, wherein the second fitting portion includes:

a second groove extending on an outer surface of the second member in a first direction along an axis of relative rotation; and a third groove extending on the outer surface of the second member from the second groove in a second direction intersecting the first direction.

12. The system according to claim 11, wherein an extending end of the third groove is in contact with the fitted portion in the second state.

13. The system according to claim 11, wherein the second member has a cylindrical shape.

14. The system according to claim 8, wherein:

the second member has an outside air communication passage that communicates the internal space of the second member with the outside air, and the air communication passage is closed in the first state and is open in the second state.

* * * * *